(12) United States Patent
Ohta et al.

(10) Patent No.: US 8,670,088 B2
(45) Date of Patent: Mar. 11, 2014

(54) OPTICAL SHEET COMPRISING A BASE COMPOSED OF A STACK OF TRANSMISSIVE SHEETS, AND A BACK-LIGHT DEVICE AND LIQUID CRYSTAL DEVICE INCORPORATING THE OPTICAL SHEET

(75) Inventors: Eiji Ohta, Miyagi (JP); Toru Abiko, Miyagi (JP); Hirokazu Odagiri, Miyagi (JP); Katsuhiro Doi, Miyagi (JP); Makoto Aoki, Miyagi (JP); Satoko Asaoka, Miyagi (JP); Miki Sudo, Miyagi (JP); Yu Andrew Chakchung, Miyagi (JP)

(73) Assignee: Sony Corporation, Tokyo (JP)

( * ) Notice: Subject to any disclaimer, the term of this patent is extended or adjusted under 35 U.S.C. 154(b) by 923 days.

(21) Appl. No.: 11/735,792

(22) Filed: Apr. 16, 2007

(65) Prior Publication Data
US 2007/0242184 A1    Oct. 18, 2007

(30) Foreign Application Priority Data

Apr. 14, 2006  (JP) ................................ 2006-112387
Apr. 14, 2006  (JP) ................................ 2006-112715

(51) Int. Cl.
*G02F 1/1335*    (2006.01)
*G02F 1/1337*    (2006.01)
*G02B 6/10*      (2006.01)

(52) U.S. Cl.
USPC ............ 349/64; 362/97.2; 362/339; 385/146; 385/901

(58) Field of Classification Search
USPC ........ 349/62–65; 362/26, 27, 97.1, 97.2, 326, 362/339, 606, 607; 385/146, 901
See application file for complete search history.

(56) References Cited

U.S. PATENT DOCUMENTS

| | | | |
|---|---|---|---|
| 5,600,456 A * | 2/1997 | Maruyama et al. ............. 349/64 |
| 6,307,675 B1 | 10/2001 | Abe |
| 6,478,438 B1 * | 11/2002 | Ishikawa et al. ............... 362/620 |
| 7,404,998 B2 * | 7/2008 | Sudo et al. .................... 428/212 |
| 2001/0010630 A1 | 8/2001 | Umemoto |
| 2003/0147043 A1 * | 8/2003 | Sahouani et al. ............. 349/194 |
| 2003/0235704 A1 | 12/2003 | Akatsu |
| 2004/0228106 A1 | 11/2004 | Stevenson |
| 2004/0228141 A1 | 11/2004 | Hay |
| 2006/0050198 A1 | 3/2006 | Kirita et al. |
| 2007/0058920 A1 * | 3/2007 | Tang ............................ 385/146 |

(Continued)

FOREIGN PATENT DOCUMENTS

| EP | 0 818 708 A1 | 1/1998 |
|---|---|---|
| JP | 06-102506 | 4/1994 |

(Continued)

OTHER PUBLICATIONS

European Search Report dated Jul. 23, 2007 (6 pages).

(Continued)

*Primary Examiner* — Akm Ullah
*Assistant Examiner* — Michael Mooney
(74) *Attorney, Agent, or Firm* — K&L Gates LLP

(57) ABSTRACT

An optical sheet is provided. The optical sheet includes: a light-transmissive base; and an optical functional layer provided to at least one surface of the base, in which the base is composed of a stack of transmissive sheets bonded while placing an adhesive material layer in between.

16 Claims, 10 Drawing Sheets

(56) References Cited

U.S. PATENT DOCUMENTS

| | | | |
|---|---|---|---|
| 2007/0103910 A1* | 5/2007 | Brickey et al. | 362/311 |
| 2007/0115407 A1* | 5/2007 | Richard et al. | 349/112 |
| 2009/0067048 A1* | 3/2009 | Battiato et al. | 359/494 |

FOREIGN PATENT DOCUMENTS

| | | |
|---|---|---|
| JP | 6102506 | 4/1994 |
| JP | 6102507 | 4/1994 |
| JP | HEI 07-270813 | 10/1995 |
| JP | HEI 11-038208 | 2/1999 |
| JP | HEI 11-219609 | 8/1999 |
| JP | 2001-194534 | 7/2001 |
| JP | 2006-078737 | 3/2005 |
| JP | 06-72249 | 3/2006 |
| JP | 2006072249 | 3/2006 |
| JP | 06-102507 | 6/2007 |
| WO | WO 2004/113069 * | 6/2004 |
| WO | 2005-006056 | 1/2005 |
| WO | 2006-031545 | 3/2006 |
| WO | 2007-055920 | 5/2007 |

OTHER PUBLICATIONS

Korean Office Action issued Aug. 21, 2013, for corresponding Korean Appl. No. 10-2007-36367.

* cited by examiner

RELATED ART

OPTICAL SHEET COMPRISING A BASE COMPOSED OF A STACK OF TRANSMISSIVE SHEETS, AND A BACK-LIGHT DEVICE AND LIQUID CRYSTAL DEVICE INCORPORATING THE OPTICAL SHEET

CROSS REFERENCES TO RELATED APPLICATIONS

The present application claims priority to Japanese Patent Application Nos. P2006-112715 and P2006-112387, filed in the Japan Patent Office on Apr. 14, 2006, the entire contents of which are being incorporated herein by reference.

BACKGROUND

The present application relates to a light-transmissive optical sheet typically used as a functional film for liquid crystal display devices, and a backlight device and a liquid crystal display device provided with the same.

Liquid crystal display devices (LCD) have larger potentials of reduction in power consumption, downsizing and thinning as compared with cathode ray tubes (CRT), and those of a variety of sizes are widely applied at present to small-sized instruments such as mobile phones and digital cameras, up to large-sized liquid crystal television sets. Under such situation, the liquid crystal display devices are required for further improvements in the luminance, view angle, rapidness in the response, and fineness in the definition.

The liquid crystal display devices are classified into those of transmission type and reflection type. In particular, the transmission type liquid crystal display device has a liquid crystal display panel composed of a liquid crystal layer held between a pair of transparent substrates and a backlight unit as a light source for illumination. The backlight unit is classified into those of direct backlight type having a light source disposed directly next to the liquid crystal display panel, and those of edge-light type.

In the backlight unit used for the liquid crystal display devices, optical sheets or films such as beam-condensing sheets including prism sheets or lens sheets aimed at aligning the direction of emission of light from the light source to the front direction, and diffusion sheets aimed at improving uniformity in the luminance of light from the light source (see Japanese Patent Application Publication No. 2006-72249 (Document 1)).

FIG. 8 shows a general back-light unit for liquid crystal display devices. In FIG. 8, reference numeral 101 represents a light source, 102 represents a reflective plate, 103 represents a prism sheet, and 104 represents a diffusion sheet. The prism sheet 103 is composed of a large number of prisms 103a having a triangular section, arranged on a light emitting side. The prism sheet 103 condenses beam from the light source 101 coming thereinto and beam reflected on the reflective plate 102 in the front direction, by allowing them to refract at the slope of the prism 103a of the prism and transmit therethrough. On the other hand, the diffusion sheet 104 diffuses beam once condensed by the prism sheet 103 over a wide angular range, and allows it to emit so as to uniformalize the luminance.

The related art prism sheet is fabricated by forming a prism sheet on the surface of a base of a predetermined thickness, by integrated forming or transfer forming. The integrated forming includes hot press process using PET (polyethylene terephthalate) or PC (polycarbonate) resin, and fusion-extrusion molding. The transfer forming is generally such as the one allowing a prism layer, typically composed of an ultraviolet curing resin, to cure and to thereby adhere to the resin sheets.

For example, Japanese Patent Application Publication No. Hei 06-102507 (Document 2) describes improvement in the luminance of the panel in the front view, by disposing, between the light source and the liquid crystal panel, a light-transmissive lens film having on one main surface thereof a large number of prisms arranged in parallel, and having a smooth surface on the other main surface, so as to allow the beam emitted from the light source to align in the direction of the normal line of the liquid crystal panel. Document 2 also describes adjustment of the pitch of the prism on the lens film to 100 μm or smaller, so as to prevent moire fringes caused by interference with the pixel pitch on the panel.

In the lens film described in the above, the action of condensing the beam from the light source into the direction of the normal line of the liquid crystal panel is exhibited on the slope of the prisms formed on the lens film, and theoretically independent of the prism pitch. It is, however, very difficult in practice to stably form the apex and the basic angles of the prism appearing as complete edges over a long period, in the process of manufacturing. Thus, the above-described apex and the basic angles tend to be rounded to some degree so that the rounded portion does not contribute to improvement in the front luminance. As a consequence, any effort of preventing the moire fringes by narrowing the prism pitch of the lens film will result in increase in the rounded portion, and fails in obtaining a desired level of larger ratio of enhancement in the luminance. Also for a case where the rounded portion is intentionally formed to the apex, any effort of preventing the moire fringes by narrowing the prism pitch of the lens film similarly fails in obtaining a desired level of enhancement in the luminance.

Japanese Patent Application Publication No. Hei 06-102506 (Patent Document 3) describes prevention of the moire fringes ascribable to interference between a large number of prisms formed there and the pixel pitch of the liquid crystal panel, as well as improvement in the luminance of the panel in the front view, by disposing, between the light source and the liquid crystal panel, a light-transmissive lens film having on one main surface thereof a large number of prisms arranged in parallel, and having on the other main surface thereof a smooth surface, and by further disposing a diffusion film between the lens film and the liquid crystal panel.

Disposition of the diffusion film between the lens film and the liquid crystal panel, however, occasionally fails in obtaining a desired level of enhancement in the luminance, depending on characteristics of the diffusion film, because the beam condensed by the prisms cannot effectively be used.

Known methods of manufacturing the above-described lens film include those based on (1) die casting, (2) hot pressing, (3) UV process, and (4) extrusion molding of a thermoplastic resin, among which those based on (3) UV process and (4) extrusion molding are advantageous in view of productivity, and extrusion molding is still more advantageous in terms of production speed. From the view point of cost, the extrusion molding process, in need of only an inexpensive thermoplastic resin, is understood as being the best method of manufacturing, because the UV process suffers from expensiveness of ultraviolet curing resins (UV resins) as well as necessity of using an expensive film such as polyethylene terephthalate (PET) film as a base.

In the field of liquid crystal TV in recent years, there have been increasing trends in expanding the screen size, and this consequently demands increase in the size of the optical sheets represented by the prism sheet.

The optical sheets generally used are 200 μm to 300 μm in thickness, and those having a screen size as large as 50 inches or above has a problem of an insufficient level of rigidity or stiffness, causing deflection, and making proper handling thereof difficult. It is also anticipated that lowering in the rigidity of the optical sheets may degrade workability in assembly of backlight devices or liquid crystal display devices, and may make it more likely to cause deflection due to heat of the backlight. This may cause disturbance in the beam condensing characteristics, and may consequently degrade the image quality.

Another possible measure may be such as thickening a base composing the prism sheet, but excessive thickness of the base makes integrated molding with the prism layer difficult.

SUMMARY

In an embodiment, an optical sheet, backlight device and liquid crystal display device, capable of preventing deflection of the sheet ascribable to expansion of the sheet size is provided.

On the other hand, there is a need of reducing the power consumption with progress of expansion in the screen size, raising a demand on liquid crystal display device capable of efficiently using the beam, and also satisfying other characteristics.

However, in the process of forming the prism geometry of the lens film used for the liquid crystal display devices, the apex tends to be rounded due to difficulty in manufacturing of dies or in complete transfer of the prism geometry, so that a desired level of front luminance cannot be obtained due to lowering in the beam condensing effect as described in the above. This phenomenon becomes more distinct as the prism pitch is small.

In another embodiment, a liquid crystal display device capable of suppressing more fringes, while achieving a desired level of front luminance is provided.

An optical sheet according to an embodiment has a light-transmissive base; and an optical functional layer provided to at least one surface of the base, in which the base is composed of a stack of light-transmissive sheets bonded while placing an adhesive material layer in between.

Because the base of the optical sheet according to the embodiment is composed of the stack of light-transmissive sheets bonded while placing an adhesive material layer in between, the total thickness of the sheets is arbitrarily adjustable depending on the thickness of the sheets to be stacked. As a consequence, an appropriate rigidity or stiffness can be ensured even if the sheet size expands, and thereby the deflection can be prevented.

The stack may be composed of a first sheet base supporting the optical functional layer; and a second sheet base opposed to the first sheet base while placing the adhesive material layer in between. There are no special limitations on materials composing the first and second sheet bases, and applicable examples include resin sheets composed of polycarbonate, PET, acrylic resin or the like, plastic plate, and glass plate.

The optical functional layer may be composed of a beam-condensing layer having a large number of irregularity portions consecutively arranged on the surface thereof. It is to be noted that, besides the above-described beam-condensing layer, a light diffusion layer and a polarized-light separation layer. These optically functional layers take part in predetermined conditioning of light such as condensation of incident beam, diffusion, separation of polarized light and so forth. Each irregularity portion can be composed of a prism having a triangular sectional geometry, or a cylindrical lens component having a hyperbolic surface, parabolic surface or an aspherical surface of higher orders.

The adhesive material layer can be configured using ultraviolet curing adhesive, pressure-sensitive adhesive, hot-melt adhesive or the like. The refractive index of the adhesive material layer is preferably equivalent to, or smaller than the refractive indices of the first and second sheet bases.

In general, resin materials tend to cause yellowing under excessive ultraviolet irradiation. The light transmitting therethrough in this case can no more keep a desired light transmission property, as being affected by such coloration of the sheet. More specifically, blue wavelength component in the transmitted light decreases. Then, addition of an ultraviolet absorber to the first and second sheet bases (more preferably, to the second sheet based closer to the light source) can suppress yellowing of the sheet base induced by ultraviolet irradiation.

It is also allowable herein to add, to the adhesive material layer, a blue dye in place of, or together with the ultraviolet absorber. Coloration of the first sheet base or the optical functional layer can therefore be corrected, and thereby modulation of light transmitted through the sheet can be prevented.

For the purpose of suppressing warping of the sheet after stacking, it is preferable to take molecular alignment of the first and second sheet bases into consideration. More specifically, the angle formed between directions of molecular alignment of the individual sheet bases is set to 20° or smaller. Making the thickness of the individual sheet bases equivalent, or adopting a configuration in which one sheet base accounts for a substantial portion of the total thickness of the sheet, is also effective in view of suppressing warping of the sheet.

By roughening the surface of the second sheet base, which is opposite to the surface faced to the first sheet base, it becomes possible to suppress scratching caused by frictional contact, or sticking to other components possibly occurs in the process of assembly of the backlight or the liquid crystal display device, while suppressing lowering of the luminance.

Another embodiment provides a liquid crystal display device which includes a light source, a first film having a plurality of lenses provided to one main surface thereof, a second film having at least a diffusion function, and a liquid crystal panel stacked in this order. In the device, lens pitch P (μm) of the first film, haze value H (%) and total light transmissivity T (%) of the second film, obtained by measurement of back scattering, and pixel pitch Pp (μm) of the liquid crystal panel satisfy the relations of H/T·Pp/P>1.6, and P≥110 μm.

The device may be preferably modified such that the lens pitch P (μm) of the first film, haze value H (%) and total beam transmissivity T (%) of the second film, obtained by measurement of back scattering, and pixel pitch Pp (μm) of the liquid crystal panel satisfy the relations of H/T·Pp/P>1.9, and P≥110 μm.

The device may be modified so that the second film is preferably a reflective polarizer or a diffusion film, a layer having a diffusion functional layer, or a tacky material layer having a diffusion function.

In the embodiment, the lenses preferably form a lens array having a prismatic, hyperbolic, or aspherical contour in the sectional geometry, and differing in the size of lenses in the near-columnar direction, or in the columnar direction.

In the embodiment, the second film having the diffusion function is preferably as the one showing diffusion functions of a different haze value, when compared between a haze value measured while directing the surface thereof, placed on the light source side when incorporated into the liquid crystal panel, to the surface of incidence, and a haze value measured while directing the surface thereof, placed on the emission side when incorporated into the liquid crystal panel, to the surface of incidence.

In the embodiment, the second film having the diffusion function is preferably the one showing diffusion functions of a larger haze value measured while directing the surface thereof, placed on the emission side when incorporated into the liquid crystal panel, to the surface of incidence, than a haze value measured while directing the surface thereof, placed on the light source side when incorporated into the liquid crystal panel, to the surface of incidence, when compared therebetween.

Additional features and advantages are described herein, and will be apparent from, the following Detailed Description and the figures.

BRIEF DESCRIPTION OF THE FIGURES

FIGS. 2A and 2B are perspective views showing exemplary configurations of a beam-condensing sheet as the optical sheet according to the first embodiment, in which FIG. 2A shows an embodiment having, as a beam-condensing layer, irregularity portions based on a prism structure, and FIG. 2B shows an embodiment having, as a beam-condensing layer, irregularity portions based on a cylindrical lens structure;

DETAILED DESCRIPTION

A detailed description of the present application in accordance with various embodiments follows including references made to the drawings.

Example 1-1

Figure 1:
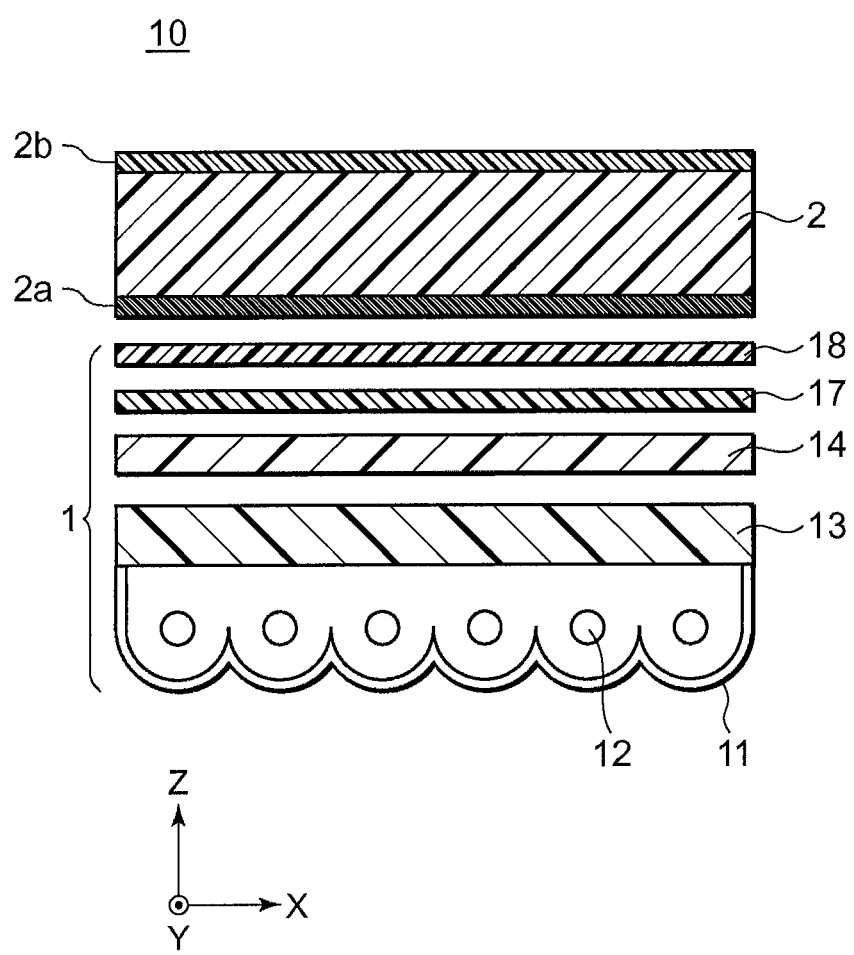
FIG. 1 is a schematic sectional view showing a configuration of the liquid crystal display device according to a first embodiment.

FIG. 1 is a sectional view schematically showing an exemplary configuration of a liquid crystal display device 10 according to one embodiment. First, the configuration of the liquid crystal display device 10 will schematically be explained.

As shown in FIG. 1, the liquid crystal display device 10 has a backlight unit 1 and a liquid crystal display panel 2. The backlight unit 1, expressed as of a direct backlight in this example, may be of an edge-light type.

As shown in FIG. 1, the backlight unit 1 is for supplying adjusted light to the liquid crystal display panel 2, and is disposed directly next to the back surface of the liquid crystal display panel 2. The liquid crystal display panel 2 displays thereon information by modulating light supplied from the backlight unit 1 in time-dependent and space-dependent manner. The liquid crystal display panel 2 has polarizer plates 2a, 2b provided respectively on both surfaces thereof. The polarizer plate 2a and the polarizer plate 2b allow only one of orthogonal polarization components of the incident light to pass therethrough, and intercept the other by absorption. The polarizer plate 2a and the polarizer plate 2b are provided so as to cross the transmission axes thereof normal to each other, for example.

The liquid crystal display panel 2 has a plurality of pixels arranged at a predetermined pitch in the transverse direction and in the longitudinal direction of the panel, and allows display of a predetermined image on the front side thereof, by pixel-wise control of transmissivity of light irradiated by the backlight unit 1. The image displayed herein is a color image, but is of course not limited thereto.

As shown in FIG. 1, the back-light unit 1 typically has a reflector plate 11, a light source 12, a diffusion plate 13, a beam-condensing sheet 14, a diffusion sheet 17 and a reflection-type polarizer 18. Provision of any other optical elements besides these components is allowable. The diffusion plate 13, the diffusion sheet 17, and the reflection-type polarizer 18 may be omitted or altered in the order of arrangement as the occasion demands.

The light source 12 is for supplying light to the liquid crystal display panel 2, a plurality of which being provided in the illustrated example, and is composed of, for example, fluorescent lamps (FL), electro-luminescence (EL) elements, light emitting diodes (LED) or the like.

The reflector plate 11 is provided so as to cover the bottom side and lateral sides of the light source 12, and is for reflecting the light emitted from the light source 12 in the bottom and lateral directions, and directing the light towards the liquid crystal display panel 2.

The diffusion plate 13 is provided over the light source 12, and is for diffusing the light emitted from the light source 12 and the light reflected on the reflector plate 11 so as to make the luminance uniform. The diffusion plate 13 used in this embodiment is a relatively thick one, having light-diffusing particles dispersed in a light-transmissive material.

The beam-condensing sheet 14 corresponds to the optical sheet according to the present application, and improves directionality, for example, of the irradiated light, by being disposed over the diffusion plate 13. Details of configuration of the beam-condensing sheet 14 will be described later.

The diffusion sheet 17 is provided over the beam-condensing sheet 14, and is for allowing the light once improved in the directionality by the beam-condensing sheet 14 to emit therethrough, after being diffused within a predetermined angular range. The diffusion sheet 17 adopted in this embodiment is such as being provided with a diffusion surface having a light-diffusing irregularity structure or the like on the light emission surface side of the light-transmissive sheet base.

The reflection-type polarizer 18 is provided over the diffusion sheet 17, and is for allowing only one of orthogonal polarization components of the light diffused by the diffusion sheet 17 to pass therethrough, and reflecting the other. The direction of vibration of the polarization component transmitting through the reflection-type polarizer 18 is set in parallel with the transmission axis of the polarizer plate 2a disposed on the light incidence side of the liquid crystal display panel 2.

Next paragraphs will detail the configuration of the beam-condensing sheet (optical sheet) 14 according to an embodiment.

Figure 2A:
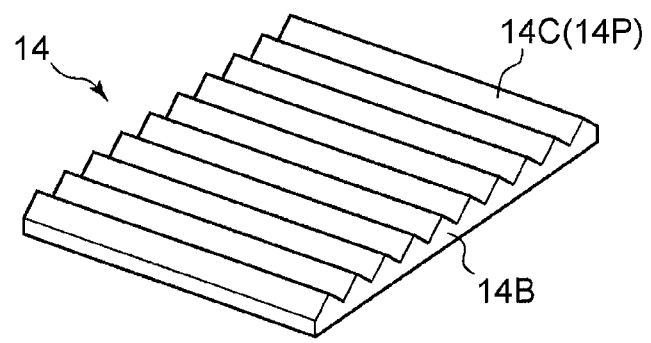
Figure 2B:
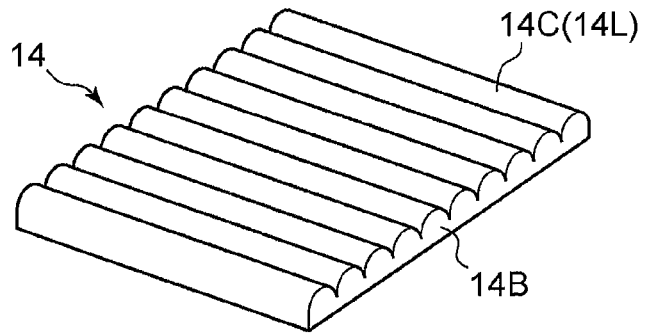
Figure 2B:
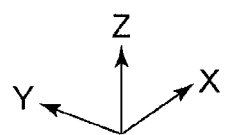

FIGS. 2A and 2B are perspective views schematically showing exemplary geometries of the beam-condensing sheet 14 according to the embodiment. The beam-condensing sheet 14 has a nearly rectangular sheet geometry, and is configured with a prism sheet or a lens sheet having a large number of irregularity portions 14C with a beam-condensing function consecutively arranged in one direction (X-direction in the drawing) on one main surface (light emitting surface) of the light-transmissive base 14B. The irregularity portions 14C corresponds to the "optical functional layer" of the present application, and this embodiment will be explained referring to a case where the optical functional layer is a beam-condensing layer composed of the irregularity portions 14C.

The beam-condensing sheet 14 shown in FIG. 2A is a prism sheet 14 having a large number of prism components 14P with a triangle cross-section, formed as the above-described irregularity portions, arranged on the surface on the light emission side thereof. The beam-condensing sheet 14 shown in FIG. 2B is a lens sheet 14 having as a large number of cylindrical lens components 14L with a hyperbolic plane, a parabolic plane or an aspherical plane of higher orders, formed as the irregularity portions, arranged on the surface on the light emission side thereof.

The sectional geometry of the prism component 14P in this example is an isosceles triangle having an apex of 90°, wherein the apex is not limited to 90°. Also the height of prism, pitch and so forth are not specifically limited, and may appropriately be determined depending on target luminance characteristics, viewing angle characteristics and the like. Specific examples of the pitch of arrangement include 10 µm, 15 µm, 30 µm, 50 µm, 80 µm, 100 µm, 110 µm, 160 µm, 200 µm, 300 µm, 350 µm and so on. A larger pitch of arrangement results in a higher luminance characteristic.

On the other hand, the cylindrical lens components 14L are formed as having a laterally-symmetrical hyperbolic or parabolic contour in the sectional geometry, which satisfies the equation (1) below, assuming Z-axis in parallel with the direction of the normal line on the optical sheet, assuming X-axis in the direction of row of the cylindrical lens component, and assuming Y-axis in the direction of generatrix of the cylindrical lens components 14L, so as to give a finite focal length on the emission side of the illumination light:

$$Z=X^2/(R+\sqrt{(R^2-(1+K)X^2)}) \quad (1)$$

where, R represents radius of curvature [µm] of the end apex, and K represents conic constant. It is to be noted that a symbol "√" used in this patent specification means a square root of a value determined by a mathematical expression following thereafter.

In another case, the cylindrical lens components 14L are formed as having a laterally-symmetrical aspherical contour in the sectional geometry, which satisfies the equation (2) below, assuming Z-axis, X-axis and Y-axis similarly to as described in the above, so as to give a finite focal length on the emission side of the illumination light:

$$Z=X^2/(R+\sqrt{(R^2-(1+K)X^2)})+AX^4+BX^5+CX^6+ \quad (2)$$

where R represents radius of curvature [µm] of the end apex, K represents conic constant, and each of A, B, C . . . represents aspherical coefficient.

The height of the cylindrical lens components 14L, pitch and so forth are not specifically limited, and may appropriately be determined depending on target luminance characteristics, viewing angle characteristics and the like. Specific examples of the pitch of arrangement of the cylindrical lens components 14L include 10 µm, 15 µm, 30 µm, 50 µm, 80 µm, 100 µm, 110 µm, 160 µm, 200 µm, 300 µm, 350 µm and so on, as in the case of prism component 14P above. A larger pitch of arrangement results in a higher luminance characteristic.

Figure 3:
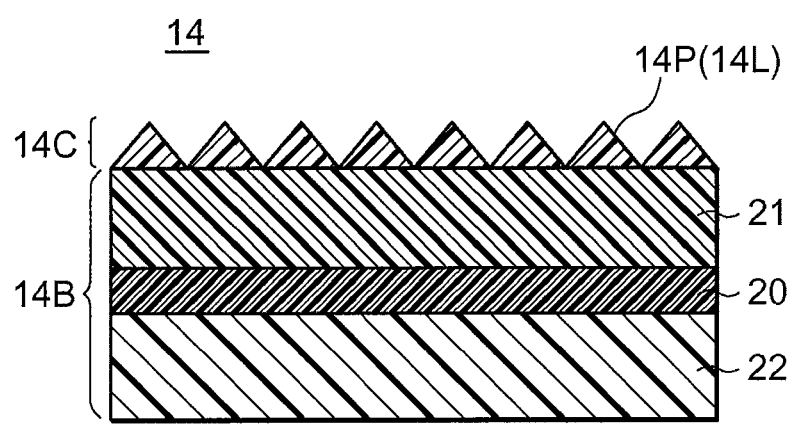
FIG. 3 is a schematic sectional view of a beam-condensing sheet according to a first example of the first embodiment (1-1)

FIG. 3 is a schematic sectional view of the beam-condensing sheet 14. The beam-condensing sheet 14 of this embodiment has the light-transmissive base 14B, and the irregularity portions 14C formed on the main surface (light emitting surface) of the base 14B on one side, in which the base 14B is composed of a stack of transmissive sheets bonded while placing an adhesive material layer 20 in between. In particular in this embodiment, the base 14B is composed of a first sheet base 21 supporting the irregularity portions 14C, and a second sheet base 22 opposed to the first sheet base 21 while placing the adhesive material layer 20 in between. By contribution of this configuration, it is made possible to ensure a necessary level of rigidity of the sheet and thereby to improve the handlability, even if the beam-condensing sheet 14 is enlarged in area with progress of expansion of the screen size.

The first sheet base 21 is configured as a base layer of the irregularity portions 14C, and is composed of a material same as, or different from the material composing the irregularity portions 14C. More specifically, the irregularity portions 14C are formed on one main surface of the first sheet base 21 by the pressing process as being integrated therewith, or the irregularity portions 14C and the first sheet base 21 are formed at the same time by the fusion-extrusion molding process. In still another case, the irregularity portions 14C are composed of an ultraviolet curing resin, cured on the first sheet base 21 and then transferred onto the first sheet base 21.

Materials composing the first and the second sheet bases 21, 22 are not specifically limited so far as they are light-transmissive, and applicable examples include polycarbonate, PET, PEN, and acrylic resin. It is possible to have the first and second sheet bases 21, 22 composed of not only the same resin material, but also different materials with each other. The second sheet base 22 may be composed of a plate such as plastic plate or glass plate. For a case where the first and second sheet bases 21, 22 are composed of resin sheets, the resin sheets may be oriented sheets or casted sheets. The stretched sheets may be of uniaxially oriented type or of biaxially oriented type.

The thickness of the first and second sheet bases 21, 22 is not specifically limited. The thickness of the individual sheets is appropriately selectable so that a target thickness of the sheet can be obtained after stacking, typically within the range from 50 µm to 500 µm, both ends inclusive. In view of preventing warping of the base 14B after stacking, it is preferable to make the thickness of the first and second sheet bases 21, 22 equivalent to each other, or by adopting a configuration in which the thickness of one sheet base accounts for a substantial portion of the total thickness of the sheet.

For an exemplary case where both of the first and second sheet bases 21, 22 are composed of the same material, the warping can be suppressed by making the thickness of these sheet bases equivalent. On the other hand, for a case where the first and second sheet base 21, 22 are composed of different materials, warping may occur even under an equivalent thickness. In this case, it is preferable to balance the thickness depending on combination of the materials. For an exemplary case where the first sheet base 21 is composed of polycarbonate, and the second sheet base 22 is composed of polyethylene terephthalate, the ratio of thickness of the first sheet base 21 and the second sheet base 22 is adjusted to 6:4 or so.

The first sheet base 21 also varies in rigidity, depending on the pitch of arrangement of the irregularity portions 14C. More specifically, under a constant thickness of the sheet, the rigidity in the direction of arrangement of the irregularity portions 14C (X direction) tends to decrease as the lens pitch becomes larger. Therefore, it is possible to keep the rigidity of the beam-condensing sheet 14 at an appropriate level, by optimizing the thickness of the first sheet base 21 and the second sheet base 22, depending on the pitch of arrangement of the irregularity portions 14C.

For the purpose of suppressing warping of the beam-condensing sheet 14, it is preferable to take molecular alignment of the first and second sheet bases into consideration. More specifically, the angle formed between directions of molecular alignment of the individual sheet bases is set to 20° or smaller.

The adhesive material layer 20 may be configured using ultraviolet curing adhesive, pressure-sensitive adhesive, hot-melt adhesive or the like, without specific limitation on the species. Also the thickness of the adhesive material layer 20 is not specifically limited, and typically adjusted to 1 µm to 100 µm, both ends inclusive.

For a case where the adhesive material layer 20 is configured using a ultraviolet curing resin, the adhesive can be cured by irradiating ultraviolet radiation through the first sheet base 21 or through the second sheet base 22. For a case where the adhesive material layer 20 is configured using a hot-melt adhesive, thermal deformation of the sheet in the process of bonding can be suppressed by using an adhesive which can melt at a temperature lower than the glass transition point (Tg) of the irregularity portions 14C and the first and second sheet bases 21, 22. Ethylene-vinyl acetate copolymer (EVA: Tg=40° C.) is a known example of this sort of hot-melt adhesive.

By allowing the adhesive material layer 20 to function as a relaxation layer against mechanical and thermal stresses exerted on the base 14B of the beam-condensing sheet 14, distortion of the beam-condensing sheet 14 can be suppressed, making it possible to maintain stable optical characteristics. For a case where the adhesive material layer 20 is allowed to function as the stress relaxing layer, the adhesive material layer 20 is preferably configured using a material softer than those used for the first and second sheet bases 21, 22.

On the other hand, also the refractive index of the adhesive material layer 20 is not specifically limited, wherein the refractive index is preferably equivalent to, or smaller than the refractive indices of the first and second sheet bases 21, 22, in view of improving the beam condensing characteristics. For an exemplary case where the first and second sheet base 21, 22 are composed of polycarbonate resin (refractive index 1.58), the adhesive material layer 20 can be configured by using an acrylic ultraviolet curing resin having a refractive index of 1.5 or around.

In thus-configured, beam-condensing sheet 14 of this embodiment, the base 14B as a base layer supporting the irregularity portions 14C is composed of a stack of the first and second sheet bases 21, 22 bonded while placing the adhesive material layer 20 in between, so that the total thickness of the sheet is arbitrarily adjustable depending on the thickness of these sheet bases 21, 22. By contribution of this configuration, the sheet can ensure an appropriate level of rigidity or stiffness even the sheet size expands, and can be prevented from deflecting.

Figure 4:
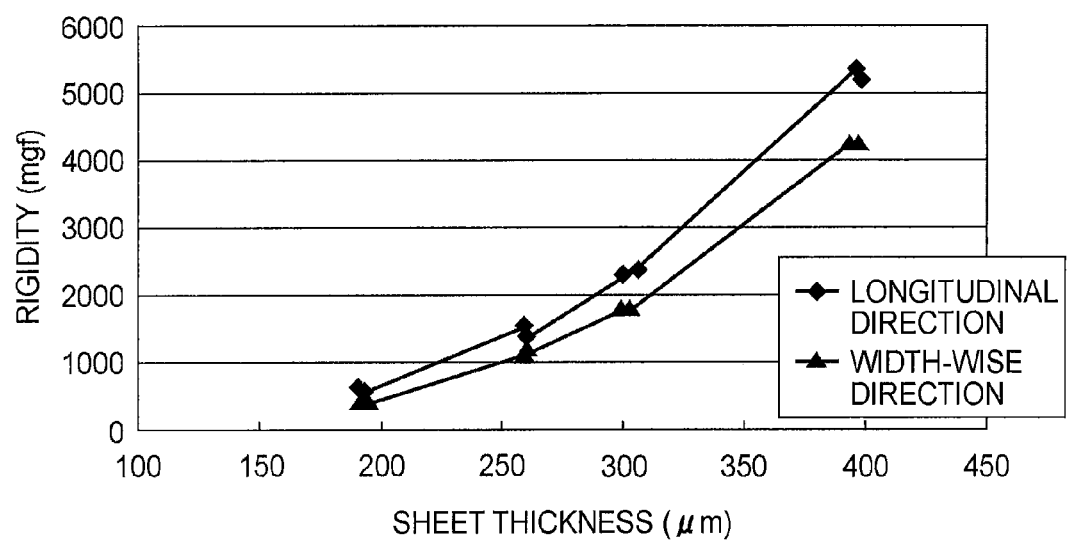
FIG. 4 is a drawing showing experimental results expressing relations between the sheet thickness and the rigidity under the pitch of arrangement of the irregularity portions adjusted to 200 μm.

FIG. 4 is a drawing showing experimental results expressing relations between the sheet thickness and the rigidity under the pitch of arrangement of the irregularity portions adjusted to 200 µm. In the drawing, the square plots represent bending stiffness measured in the longitudinal direction of prism (direction of ridges), and triangle plots represent bending stiffniess measured in the direction of width of prism (direction of arrangement). It is found that the stiffness is larger in the longitudinal direction than in the width-wise direction. It is also found that the rigidity both in the longitudinal direction and the width-wise direction increases as the thickness of sheet increases. As is obvious from this example, a desired level of rigidity can readily be obtained by adjusting the thickness of the base 14B of the beam-condensing sheet 14.

Another advantage resides in that the beam-condensing sheet 14 is prevented from deflecting due to insufficient rigidity, so that the workability in the assembly process of the backlight unit 1 or the liquid crystal display device 10 can be improved, and the beam condensing property is prevented from degrading, due to incorporation of the beam-condensing sheet 14 into the back-light unit 1 while being kept in an inappropriate attitude with deflection, waviness and the like. It is also made possible to maintain a stable beam-condensing property while suppressing deflection induced by heat of the back-light, and to prevent image quality from degrading.

Example 1-2

Figure 5:
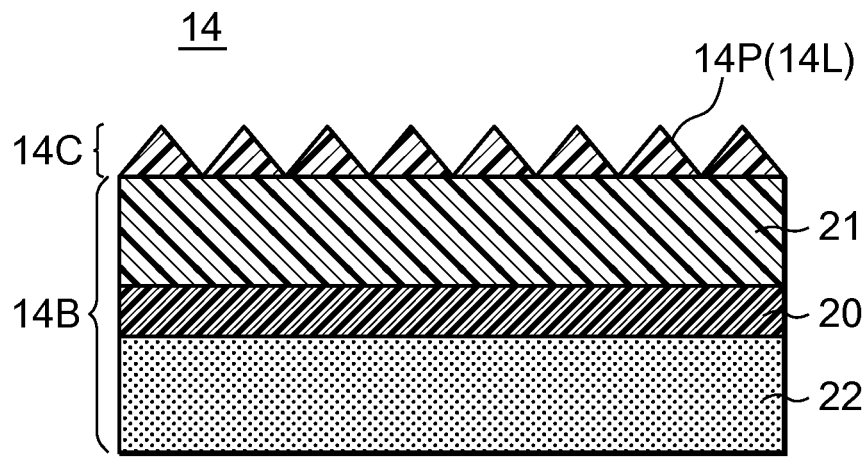
FIG. 5 is a schematic sectional view of a beam-condensing sheet according to a second example of the first embodiment (1-2)

FIG. 5 shows Example 1-2 of the present application. It is to be noted that any components corresponded to those in the above-described first embodiment will be given with the same reference numerals, so as to avoid repetitive explanation.

In general, resin materials such as polycarbonate tend to cause yellowing under excessive ultraviolet irradiation. The light transmitted therethrough in this case can no more keep an expected light transmission property, as being affected by such coloration of the sheet. More specifically, blue wavelength component in the transmitted light decreases when the yellowing of the sheet becomes severe, and thereby images displayed on the liquid crystal display panel 2 are yellowed.

Therefore in this embodiment, an ultraviolet absorber is added to at least one of, or both of the first sheet base 21 and the second sheet base 22 composing the base 14B of the beam-condensing sheet 14, so as to suppress the above-described yellowing of the beam-condensing sheet 14. The configuration shown in FIG. 5 expresses an exemplary case where the ultraviolet absorber is added to the second sheet base 22.

For a case where the adhesive material layer 20 is composed of an ultraviolet curing adhesive, the ultraviolet absorber is added to either one of the first and second sheet bases 21, 22, because the adhesive need be cured. Preferably, yellowing of the beam-condensing sheet 14 as a whole can be suppressed, by adding the ultraviolet absorber to the second sheet base 22 which is closer to the light source, as shown in this example. On the contrary, for a case where the adhesive material layer 20 is not composed of a ultraviolet curing adhesive, the ultraviolet absorber can be added to both of the first and second sheet bases 21, 22.

Examples of the ultraviolet absorber include those of salicylic acid-base, benzophenone-base, benzotriazole-base and cyanoacrylate-base, and specifically include ADK STAB LA-31, ADK STAB LA-32 (from ADEKA Corporation), Cyasorb UV-5411 (from Sun Chemical Co., Ltd.), Tinuvin P, Tinuvin 234, Tinuvin 320, Tinuvin 327, (from Ciba Geigy Corp.), Sumisorb 110, Sumisorb 140 (from Sumitomo Chemical Co., Ltd.), Kemisorb 110, Kemisorb 140, Kemisorb 12, Kemisorb 13 (from Chemipro Kasei Kaisha, Ltd.), Uvinul X-19, Uvinul Ms-40 (from BASF), Tomisorb 100, Tomisorb 600 (from Yoshitomiyakuhin Corp.), and Viosorb-80 and Viosorb-90 (from Kyodo Chemical Co., Ltd.). Examples of the light stabilizer include those of hindered amine-base, and specifically include ADK STAB LA-52 (from ADEKA Corporation), Sanol LS-770, Sanol LS-765, Sanol LS-774 (from Sankyo Co., Ltd.), and Sumisorb TM-061 (from Sumitomo Chemical Co., Ltd.).

The amount of ultraviolet absorber added to the sheet base is preferably adjusted to the range of 0.02 wt % or more and 0.4 wt % or less. The amount of addition less than 0.02 wt % will fail in suppressing changes in the hue. On the other hand, the amount of addition exceeding 0.4 wt % will undesirably yellow the sheet base. It is also allowable to add other additives such as light stabilizer, antioxidant, antistatic agent and so forth, in addition to the ultraviolet absorber.

To the adhesive material layer, a blue dye in place of, or together with the configuration in which the sheet bases 21, 22 can be added with the ultraviolet absorber in an embodiment. Coloration of the first sheet base or the optical functional layer can therefore be corrected, and thereby light transmitted through the sheet can be prevented from being modulated.

Example 1-3

Figure 6:
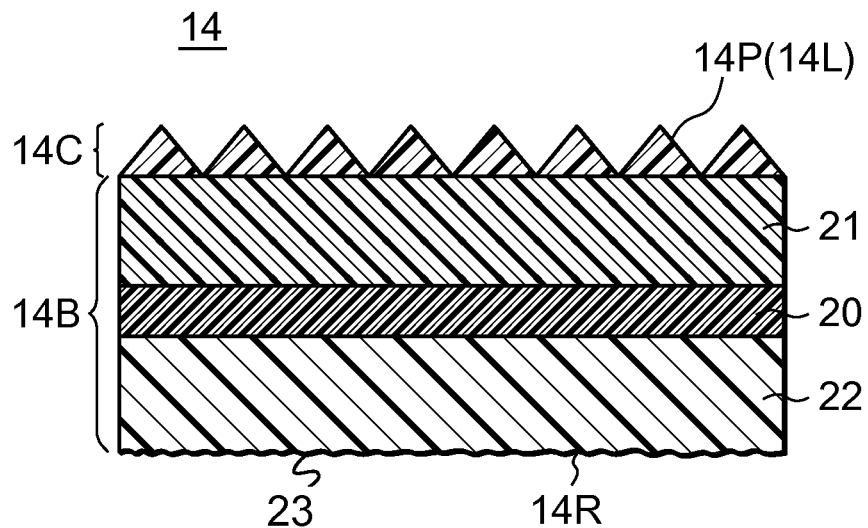
FIG. 6 is a schematic sectional view of a beam-condensing sheet according to a third example of the first embodiment (1-3)

FIG. 6 shows Example 1-3. It is to be noted that, in this drawing, any components corresponded to those in the above-described first embodiment will be given with the same reference numerals, so as to avoid repetitive explanation.

The beam-condensing sheet 14 of this example has a roughened surface 14R on the beam-incident surface side of the beam-condensing sheet 14, that is, on the surface of the second sheet base 22 opposite to the surface faced to the first sheet base 21. By providing the roughened surface 14R to the beam-condensing sheet 14 on the beam incident surface side thereof, reflectivity of light incident from the light source side can be reduced, and thereby the luminance characteristics can be improved. The beam-condensing sheet 14 can be prevented from being scratched on the beam entrance surface side thereof, due to frictional contact with other components. The roughened surface 14R is also contributive to prevention of sticking with other components by virtue of reduction in the contact area.

The roughened surface 14R can be formed by a method providing a similar roughened surface to a transfer surface of a die used for forming the beam-condensing sheet 14, in particular the second sheet base 22, and transferring the pattern to the second sheet base 22 in the process of molding. It is also allowable to obtain the roughened surface by blasting or etching the back surface of thus-formed second sheet base 22.

The above-described roughened surface can be configured by fine irregularities 23 formed on the back surface of the sheet base 22. The height of the projections 23 is not specifically limited, but preferably adjusted to 0.20 μm or higher above the average center level (JIS B0601-1994). The density of the projections 23 having a height of 0.20 μm or higher above the average center level preferably falls in a range of 70/mm$^2$ or more and 400/mm$^2$ or less. By adjusting the density of projections 23 to 70/mm$^2$ or higher, blurring in the appearance due to interference with the flat portion of the diffusion plate 13 disposed on the back surface side of the beam-condensing sheet 14 can be ameliorated. By adjusting the density of projections 23 to 400/mm$^2$ or lower, lowering in the luminance of the liquid crystal display device, caused by provision of the projections 23 on the back surface side of the beam-condensing sheet 14, can be suppressed.

Average distance between every adjacent projections 23 having a height of 0.20 μm above the average center level is not specifically limited, but is preferably adjusted to, for example, 50 μm or more and 120 μm or less. By adjusting the average distance of the projections 23 to 50 μm or larger, lowering in the luminance of the liquid crystal display device, caused by provision of the projections on the back surface side of the beam-condensing sheet 14, can be suppressed. By adjusting the average distance of the projections 23 to 120 μm or smaller, the surface of the diffusion plate 13 can be prevented from being scratched due to contact with the back surface of the beam-condensing sheet 14, and blurring in the appearance due to interference with the flat portion of the diffusion plate 13 can be ameliorated.

The projections on the back surface (beam incidence surface) of the beam-condensing sheet 14 are preferably provided so as to adjust the haze of the beam-condensing sheet to not larger than 60% in the state having no irregularity portion 14C formed thereon, and more preferably so as to adjust the haze of the beam-condensing sheet to not larger than 20%. It is also preferable that the average slope of the back surface of the beam-condensing sheet 14, having the projections 23 formed thereon, is adjusted to 0.25 rad or smaller.

Example 1-4

Figure 7:
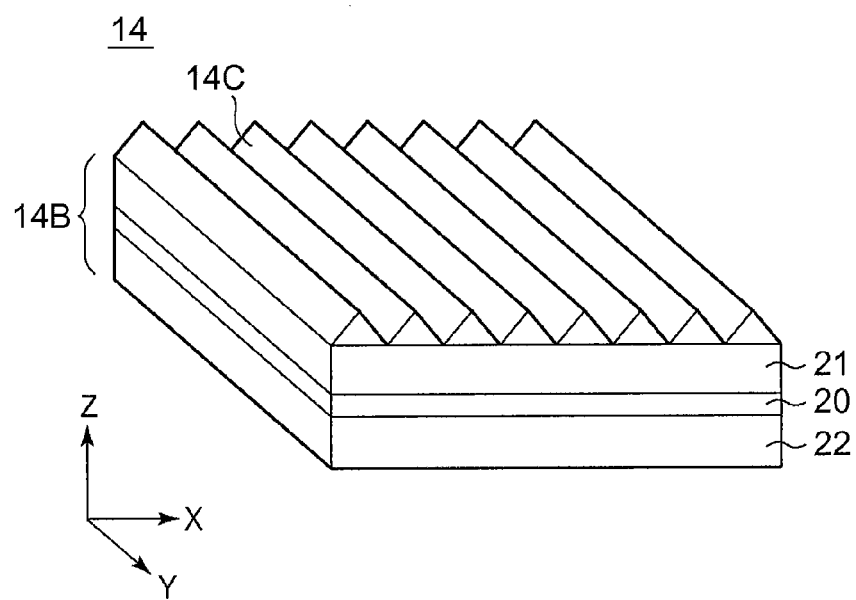
FIG. 7 is a schematic sectional view of a beam-condensing sheet according to a fourth example of the first embodiment (1-4)
Figure 8:
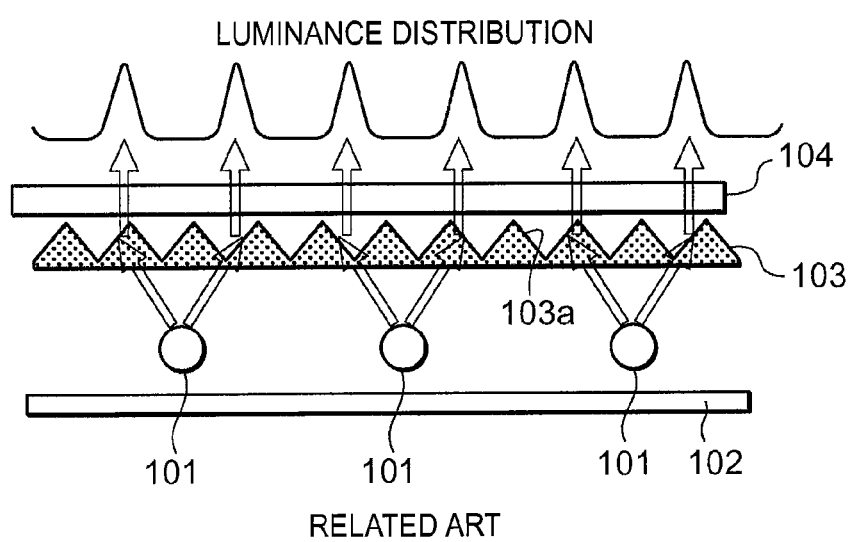
FIG. 8 is a drawing explaining an operation of a prism sheet in a related art backlight unit.

FIG. 7 shows Example 1-4 of the present application. It is to be noted that any components corresponded to those in the above-described first embodiment will be given with the identical reference numerals, so as to avoid repetitive explanation.

The beam-condensing sheet 14 of this example is configured so that the first sheet base 21 and the second sheet base 22 are bonded therein with each other, while placing the adhesive material layer 20 in between, and the first sheet base 21 has different refractive indices in the direction of ridges (X-direction in the drawing) of the irregularity portions 14C, and in the direction of arrangement (Y-direction in the drawing).

In this embodiment, the refractive index ny in the direction of ridges of the irregularity portions 14C is set larger than the refractive index nx in the direction of arrangement of the irregularity portions 14C (nx>ny). By providing such in-plane anisotropy of refractive index to the first sheet base 21 having the irregularity portions 14C, polarization component oscillating in the X-direction and polarization component oscillating in the Y-direction, contained in the incident beam, can be differed from each other in the refractive transmission action. In particular, by defining as nx>ny, that is, by setting the refractive index of the component oscillating in the X-direction larger than the refractive index of the component oscillating in the Y-direction, the transmittance of the component oscillating in the Y-direction can be set larger than the transmittance of the component oscillating in the X-direction.

As a consequence, according to the beam-condensing sheet 14 of this embodiment, not only the beam condensing action for the back-light beam (incident beam), but also a certain level of polarized-light separation action can be obtained. The luminance can therefore be improved.

In one possible method of manufacturing the first sheet base 21 having the in-plane anisotropy as described in the above, a predetermined level of anisotropy of refractive index can be raised by orienting the first sheet base 21 having the irregularity portions 14C formed thereon. For the case of this example, a material showing a lowered refractive index in the direction of orienting is used, and the first sheet base 21 is oriented in the direction of the ridges of the irregularity portions 14C. A larger effect of improving the luminance can be obtained, as the in-plane difference in refractive index Δn(=nx−ny) increases.

Examples of materials showing a lowered refractive index in the direction of orienting include methacrylic resin such as polymethyl methacrylate, polystyrene, styrene-acrylonitrile copolymer (AS resin), styrene-methyl methacrylate copolymer, and mixtures of them.

On the other hand, a material showing an increased refractive index in the direction of orienting, so as to configure the beam-condensing sheet 14 showing a larger refractive index in the direction of ridges than in the direction of arrangement of the irregularity portions 14C can be used in an embodiment. Examples of materials showing an increased refractive index in the direction of stretching include polycarbonate, polyvinyl alcohol, polyester, polyvinylidene fluoride, polypropylene, polyethylene terephthalate (PET), polyethylene naphthalate (PEN), mixtures of them, and copolymers such as PET-PEN copolymer.

The above-described embodiments exemplified, for example, the optical functional layer, the optical sheet 14 provided with the beam-condensing layer having the irregularity portions 14C on the light emitting surface thereof. However, the present application is not limited thereto, and is applicable also to any optical sheets containing other optical functional layers such as polarized-light separation layer.

Although not specifically mentioned in the examples of the embodiment in the above with respect to the surfaces to be bonded of the first sheet base 21 and the second sheet base 22, they may have a certain kind of structural surface, without being limited to flat surface. For example, by forming the roughened surface 14R described referring to FIG. 5 also on the surface to be bonded of the first sheet base 21, the reflectivity of light at the interface between the adhesive material layer 20 and the first sheet base 21 can be reduced, and thereby the luminance can be improved. It is also allowable to form the prism structure also on the surface to be bonded of the first sheet base 21, so as to allow it to exhibit a predetermined optical function.

The base 14B of the beam-condensing sheet 14 described in the embodiments in the above was configured by the stack of two sheets of the first and second sheet bases 21, 22, wherein the number of stacking may be 3 or more.

Next, examples of a second embodiment will be explained referring to the drawings. It is to be noted that, in all drawings relevant to the examples of the embodiment below, any identical or correspondent components will be given with the same reference numerals.

Example 2-1

(2-1-1) Configuration of Liquid Crystal Display Device

Figure 9:
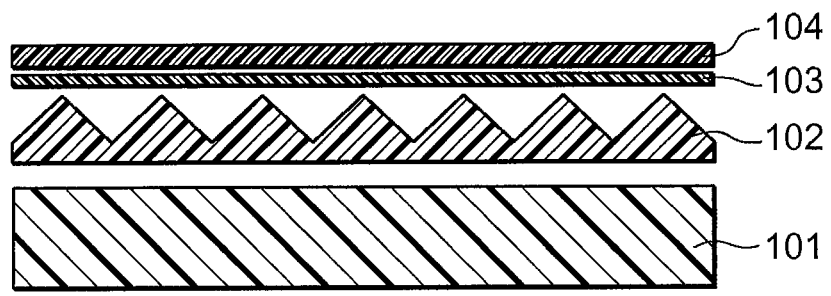
FIG. 9 is a sectional view showing an exemplary configuration of a liquid crystal display device according to a first example of a second embodiment (2-1)

FIG. 9 shows an exemplary configuration of the liquid crystal display device according to the second embodiment. The liquid crystal display device has a light source 101, a first film 102 provided over the light source 101, a second film 103 provided on the first film 102, and a liquid crystal panel 104 provided on the second film 103.

The light source 101 is for supplying light to the liquid crystal display panel 104, and is typically composed of fluorescent lamps (FL), electro-luminescence (EL) elements, and light emitting diodes (LED) or the like. The first film 102 is a lens film for improving, for example, directionality of beam emitted from the light source 101.

Figure 10:
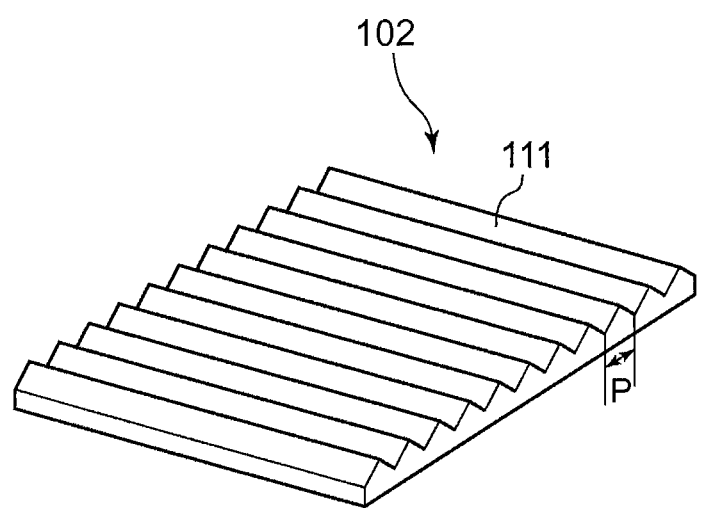
FIG. 10 is a schematic perspective view showing an exemplary configuration of a first film.

FIG. 10 shows an exemplary configuration of the first film 102. In the explanation below, one main surface of the film on the side of incidence of beam from the light source 101 will be referred to as a back surface, and the other main surface on the side of emission of beam from the light source 101 will be referred to as a front surface. The film referred to herein means that in a form of thin film or thin plate, and the film includes sheet and substrate.

A flat plane is provided to the back surface side of the first film 102, and a lens array is provided to the front surface side thereof. The lens array is composed of a large number of columnar unit lenses consecutively arranged in the direction normal to the generatrix thereof, in which each columnar unit lens has a shape of triangular prism, cylinder, hyperbolic column or parabolic column, or aspherical column, for example. In other words, the lens surface of the columnar unit lens is a triangular prismatic surface, cylindrical surface, hyperbolic surface or parabolic surface, and aspherical surface. The unit lens 111 has a focal point fa on the side through which light from the light source 101 is emitted.

The second film 103 is a film having at least a diffusion function, and is a diffusion film or a reflective polarizer, for example. The diffusion film is for diffusing the beam transmitted through the first film 102. The reflective polarizer is for allowing only one of orthogonal polarization components contained in the beam transmitted through the first film 102 to pass therethrough, and reflecting the other.

Lens pitch P (μm) of the first film 102 and haze value H(%) and total beam transmissivity T(%) of the second film 103, and pixel pitch Pp (μm) of the liquid crystal panel 104 preferably satisfy the relation of H/T·Pp/P>1.6, more preferably H/T·Pp/P>1.9.

The second film 103 provided with the above-described diffusion function has a diffusion function in which a haze value measured while setting one surface of the second film, placed on a light source side when incorporated into the liquid crystal panel 104, as a surface of incidence, is different from a haze value measured while setting another surface of the second film, placed on an emission side when incorporated into the liquid crystal panel 104, to the surface of incidence.

The second film 103 provided with the above-described diffusion function has a diffusion function in which a haze value measured while setting one surface of the second film, placed on the emission side when incorporated into the liquid crystal panel 104, as the surface of incidence, is larger than a haze value measured while setting another surface of the second film, placed on the light source side when incorporated into the liquid crystal panel 104, as the surface of incidence.

The liquid crystal panel 104 is for displaying information after modulating light supplied from the light source 101 in a time-dependent and space-dependent manner. On both surfaces of the liquid crystal panel 104, polarizer plates (not shown) are provided. Each polarizer plate is for allowing only one of orthogonal polarization components of the incident light to pass therethrough, and intercept the other by absorption. The polarizer plates on both surfaces of the liquid crystal panel 104 are provided so as to cross the transmission axes thereof normal to each other, for example.

(2-1-2) Configuration of Film Forming Apparatus

Figure 11:
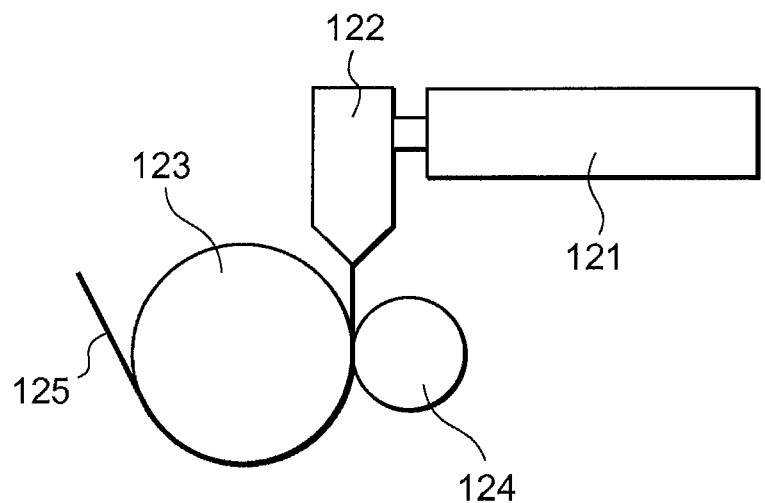
FIG. 11 is a schematic drawing showing an exemplary configuration of a film forming apparatus forming the first film.

FIG. 11 shows an exemplary configuration of a film forming apparatus forming the above-described first film 102. The film forming apparatus has an extruder 121, a T-die 122, a forming roll 123 and an elastic roll 124.

At least one species of transparent thermoplastic resin is used for formation of the first film 102. The thermoplastic resin preferably has a refractive index of 1.4 or larger, when considering a function of controlling the direction of emission of beam. Examples of such resin include polycarbonate, acrylic resin represented by polymethyl methacrylate, polyester resin represented by polyethylene terephthalate and amorphous polyester resin copolymer, polystyrene resin, and polyvinyl chloride. Considering the transferability of the lens pattern by extrusion molding, the viscosity in a fused state at around the molding temperature is preferably 1000 Pa or more and 10000 Pa or less.

The thermoplastic resin is still more preferably added with at least one type of mold releasing agent. By adding the mold releasing agent in this way, adhesiveness between the forming roll 123 and the film 125 exhibited when the film 125 is separated from the forming roll 123 can be adjusted, so as to prevent the film 125 from getting separation lines. The amount of addition of the mold-releasing agent to the thermoplastic resin is preferably adjusted to a range of 0.02 wt % or more and 0.4 wt % or less, of the released resin. The amount of addition of less than 0.02 wt % may degrade the mold releasing property, and may produce the separation lines on the film 125, whereas the amount of addition exceeding 0.4 wt % will excessively enhance the mold releasing property, and will result in separation on the forming roll 123 before the transparent thermoplastic resin cures, undesirably causing deformation of the shape of the unit lens 111.

The thermoplastic resin is preferably added with at least one type of ultraviolet absorber or a light stabilizer. By adding the ultraviolet absorber or the photo-stabilizer, changes in hue induced by exposure of light from the light source 101 can be suppressed. Examples of the ultraviolet absorber include those of salicylic acid-base, benzophenone-base, benzotriazole-base and cyanoacrylate-base, and specifically include ADK STAB LA-31, ADK STAB LA-32 (from ADEKA Corporation), Cyasorb UV-5411 (from Sun Chemical Co., Ltd.), Tinuvin P, Tinuvin 234, Tinuvin 320, Tinuvin 327 (from Ciba Geigy), Sumisorb 110, Sumisorb 140 (from Sumitomo Chemical Co., Ltd.), Kemisorb 110, Kemisorb 140, Kemisorb 12, Kemisorb 13 (from Chemipro Kasei Kaisha, Ltd.), Uvinul X-19, Uvinul Ms-40 (from BASF), Tomisorb 100, Tomisorb 600 (from Yoshitomiyakuhin Corp.), and Viosorb-80 and Viosorb-90 (from Kyodo Chemical Co., Ltd.). Examples of the light stabilizer include those of hindered amine-base, and specifically include ADK STAB LA-52 (from ADEKA Corporation), Sanol LS-770, Sanol LS-765, Sanol LS-774 (from Sankyo Co., Ltd.), and Sumisorb TM-061 (from Sumitomo Chemical Co., Ltd.). The amount of addition of the ultraviolet absorber or light stabilizer relative to the thermoplastic resin is preferably adjusted to the range from 0.02 wt % or more and 0.4 wt % or less. The amount of addition less than 0.02 wt % will fail in suppressing changes in the hue, and the amount of addition exceeding 0.4 wt % will cause yellowing of the film 25.

Besides the above-described mold releasing agent and the ultraviolet absorber, additives such as anti-oxidant, anti-static agent, colorant, plasticizer, solubilizing agent, and flame retardation agent can be added in an embodiment. Most of the additives, however, are causative of generation of gas in the process of fusion extrusion under heating using the T-die 122, and thereby degrades the film forming property, and degrades the working environment. Therefore, a smaller total amount of addition of the additives is more preferable, and is preferably adjusted to 2 wt % or less of the thermoplastic resin.

The extruder 121 fuses a resin material supplied from a not-shown hopper, and supplies it to the T-die 122. The T-die 122 has a straight-line opening, and extrudes therethrough the resin material supplied from the extruder 121, while spreading the resin as wide as a desired film width.

The forming roll 123 has a cylindrical shape, and is configured as being freely rotatable around the center axis thereof assumed as the axis of rotation. The cylindrical surface of the forming roll 123 has carved on the cylindrical surface thereof an engraved pattern used for transferring a fine pattern onto the film 125 discharged from the T-die 122. The engraved pattern is composed of, for example, fine irregularities used for transferring the unit lens 111 onto the film, and is formed as being arranged in the circumferential direction or in the width-wise (height-wise) direction of the cylindrical forming roll 123. The irregularities are formed by, for example, precision cutting using a diamond bite. The forming roll 123 is configured as being coolable. More specifically, the forming roll 123 has one or two or more fluid passageways allowing a coolant to flow therethrough. An oil medium, for example, can be used as the coolant.

The elastic roll 124 has a cylindrical shape, and configured as being freely rotatable around the center axis thereof assumed as the axis of rotation. The surface of the elastic roll 124 is configured as being susceptible to elastic deformation, so as to allow the surface thereof, brought into contact with the forming roll 123, to squash when the film 125 is nipped between the forming roll 123 and the elastic roll 124.

The elastic roll 124 is covered, for example, with a seamless cylinder composed of a Ni-plated layer, and has therein an elastic component allowing the surface of the elastic roll 124 to cause elastic deformation. The elastic roll 124 is not specifically limited in terms of configuration and material, as far as the surface thereof can cause elastic deformation when it is brought into contact with the forming roll 123 under a predetermined level of pressure. Applicable examples of the material include rubber, metal and composite materials. The elastic roll 124 is configured also as being coolable. More specifically, the elastic roll 124 has one or more fluid passageways allowing a coolant to flow therethrough. For example, water is applicable as the coolant.

(2-1-3) Method of Manufacturing First Film

Next, an exemplary method of fabricating the film using thus-configured film forming apparatus will be explained. First, a resin material is fused in the extruder 121, successively supplied to the T-die 122, and discharged consecutively from the T-die 122 to thereby form the film 125. Next, the film 125 discharged out from the T-die 122 is then nipped by the forming roll 123 and the elastic roll 124. By this process, the engraved pattern on the forming roll 123 is transferred onto the surface of the film 125. The film 125 is then separated from the forming roll 123, and cut as being corresponded to the size of the liquid crystal panel 104. By these processes, a desired first film 102 can be obtained.

As has been described in the above, the first example of the second embodiment provides the liquid crystal display device having the light source 101, the first film 102 having a large number of lens units provided in parallel on one main surface thereof, the second film 103 having at least a diffusion function, and the liquid crystal panel 104 stacked in this order. In the liquid crystal display device, the relation of H/T·Pp/P>1.6, more preferably H/T Pp/P>1.9, is satisfied assuming the pitch of the unit lenses 111 of the first film 102 as P (μm), assuming the panel pitch as Pp (μm), haze value of the second film 103 as H(%), and total beam transmissivity as T. As a result, the liquid crystal display device is not causative of moire fringes, while achieving a desired level of front luminance of the panel.

According to the method of fabricating the film in Example 2-1, the first film 102 is formed by extrusion molding, raising effects of reducing the cost of material of the first film 102, improving the productivity of the first film 102, and suppressing warping of the first film 102.

Example 2-2

Next, the second embodiment will be explained. In the description below, any constituent same as those in Example 2-1 will be given with the same reference numerals, so as to avoid repetitive explanation.

Figure 12:
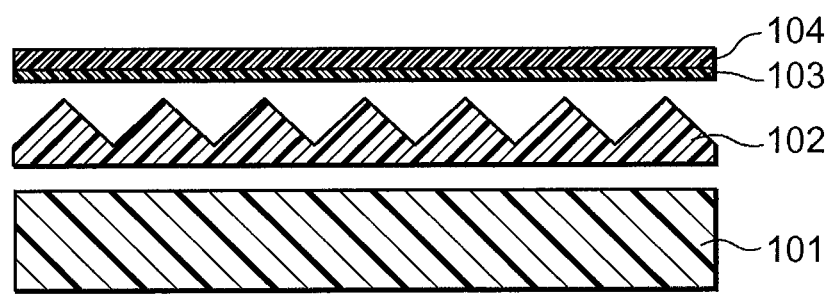
FIG. 12 is a schematic drawing showing an exemplary configuration of a liquid crystal display device according to a second example of the second embodiment (2-2)

FIG. 12 shows an exemplary configuration of the liquid crystal display device according to Example 2-2 of the second embodiment. The liquid crystal display device has a light source 101, a first film 102 provided over the light source 101, and a liquid crystal panel 104, wherein the liquid crystal panel 104 has a second film 103 integrated therewith on the first film 102 side.

Example 2-3

Next, Example 2-3 will be explained. It is to be noted that any identical constituents will be added with identical reference numerals as in Example 2-1, so as to avoid repetitive explanation.

Figure 13:
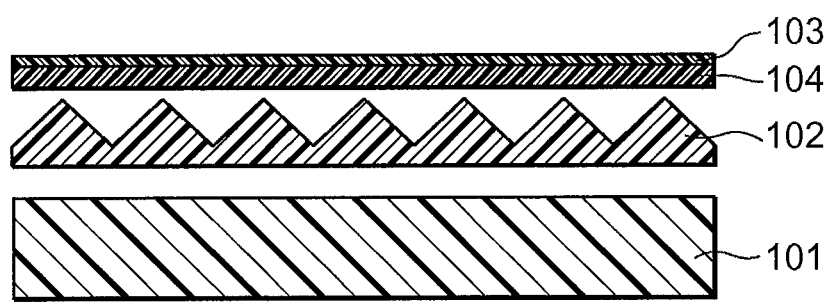
FIG. 13 is a schematic drawing showing an exemplary configuration of a liquid crystal display device according to a third example of the second embodiment (2-3)

FIG. 13 shows an exemplary configuration of the liquid crystal display device according to the Example 2-3 of the second embodiment. The liquid crystal display device has a light source 101, a first film 102 provided over the light source 101, and a liquid crystal panel 104, wherein the liquid crystal panel 104 has a second film 103 integrated therewith on the opposite side of the first film 102.

EXAMPLES

<Samples 1-1 to 1-10, 1-14 to 1-15, 2-1 to 2-10, 3-1 to 3-10, 4-1 to 4-10>

The lens film was formed as described below, using the film forming apparatus shown in FIG. 11. First, polycarbonate E2000R (from Mitsubishi Engineering-Plastics Corporation) was discharged from the T-die 122, nipped by the forming roll 123 and the elastic roll 124, allowed to wrap around the forming roll 123, and the resultant film 125 was separated from the forming roll 123. Next, thus-separated film 125 was cut as being corresponded to the size of the liquid crystal panel. By these processes, the lens film having the prismatic unit lenses consecutively provided on one main surface thereof was obtained. The lens pitch (lens width) P was adjusted to any of the values shown in Table 3 and Table 4.

Next, each of liquid crystal display devices having a diffusion film provided therein was fabricated as below. First, a diffusion film having haze H, total beam transmissivity Tt, diffused light Td, and linear transmittance Tp shown in Table 1 and Table 2 was obtained, and a 19-inch liquid crystal panel having a pixel pitch of 320 μm was obtained. A 19-inch liquid crystal display device was obtained by stacking the light source, the lens film, the diffusion film, and the liquid crystal panel in this order.

<Samples 1-11 to 1-13, 2-11 to 2-13, 3-11 to 3-13, 4-11 to 4-13>

First, the lens films having the lens pitches shown in Table 3 and Table 4 were obtained similarly to samples 1-1 to 1-10, 1-14 to 1-15, 2-1 to 2-10, 3-1 to 3-10, 4-1 to 4-10.

Next, each of the liquid crystal display devices having a tacky diffusion layer provided therein was fabricated as below. First, a polarizer plate was bonded to the beam incident surface side of a 19-inch liquid crystal panel having a pixel pitch of 320 μm, while placing a tacky diffusion layer having haze H, total beam transmissivity Tt, diffused light Td, and linear transmittance Tp shown in Table 1 and Table 2 in between, to thereby obtain the liquid crystal panel having the tacky diffusion layer provided thereto. Next, the light source, the lens film, and the liquid crystal panel were stacked in this order, to thereby obtain a 19-inch liquid crystal display device.

<Samples 1-16, 2-14, 3-14, 4-14>

First, the lens films having the lens pitches shown in Table 3 and Table 4 were obtained similarly to samples 1-1 to 1-10, 1-14 to 1-15, 2-1 to 2-10, 3-1 to 3-10, and 4-1 to 4-10.

Next, each of the liquid crystal display devices having no diffusion film provided therein was fabricated as below. A liquid crystal panel having a pixel pitch of 320 μm was obtained, and a 19-inch liquid crystal display device was obtained by stacking the light source, the lens film, and the liquid crystal panel in this order.

<Sample 25-1>

"Thick BEF III" under the trade name of Sumitomo-3M Company, the diffusion film 102 and a 19-inch liquid crystal panel having a pixel pitch of 320 μm were obtained, and a 19-inch liquid crystal display device was obtained by stacking the light source, "Thick BEF III", the diffusion film 102 and the liquid crystal panel in this order.

<Samples 26-1 to 26-4>

First, the lens films having the lens pitches shown in Table 17 and Table 18 were obtained completely similarly to samples 1-1 to 1-10, 1-14 to 1-15, 2-1 to 2-10, 3-1 to 3-10, and 4-1 to 4-10.

Next, each of the liquid crystal display devices having a reflective polarizer provided therein was fabricated as below. First, a reflective polarizer (under the trade name of DBEFD from Sumitomo-3M Company) having haze H, total beam transmissivity Tt, diffused light Td, and linear transmittance Tp shown in Table 1 and Table 2 was obtained, and a 19-inch liquid crystal panel having a pixel pitch of 320 μm was obtained, and a 19-inch liquid crystal display device was obtained by stacking the light source, the lens film, the reflective polarizer, and the liquid crystal panel in this order.

Next, each of the liquid crystal display devices obtained as described in the above was subjected to evaluation of generation of moire fringes, and to measurement of the front luminance and view angle. Results are shown in Tables 3 to 4, and Tables 15 to 18.

Evaluation of Moire Fringes: In a dark room, each of the liquid crystal display devices obtained according to the individual configurations was supplied with video input, so as to bring it into the white state, and state of generation of moire fringes was visually observed from the straight front and from oblique directions. In the column of evaluated moire fringes in Tables, "○" represents absence of moire fringes, and "x" represents occurrence of moire fringes.

Measurement of Front Luminance: In a dark room, each of the liquid crystal display devices obtained according to the individual configurations was supplied with video input, so as to bring it into the white state, kept illuminated for 2 hours, and the luminance was evaluated using a spectroradiometer "CS-1000" from Konica Minolta Holdings Inc., set 500 mm away from the panel surface. The measurement was repeated three times, and an average value was adopted.

Measurement of View Angle: In a dark room, each of the liquid crystal display devices obtained according to the individual configurations was supplied with video input, so as to bring it into the white state, kept illuminated for 2 hours, and the view angle was evaluated using "EZ-Contrast" from ELDIM set on the surface of the panel. Angles in the horizontal direction and vertical direction with respect to the longitudinal edge side of the panel, where half of the front luminance is achieved, were read as view angle values.

<Samples 5-1 to 8-14, 26-5 to 26-8>

Forty-inch liquid crystal display devices having a pixel pitch of 460 μm were obtained completely similarly to the above-described samples 1-1 to 4-14, 26-1 to 26-4, except that 40-inch liquid crystal panels (full high definition television) were used. Next, evaluation of moire fringes, and measurement of the front luminance and view angle were carried out similarly to those for the above-described samples 1-1 to 4-14, 26-1 to 26-4. Results are shown in Tables 5 and 6 and Tables 17 and 18.

<Samples 9-1 to 12-14, 26-9 to 26-12>

Thirty-two-inch display devices having a pixel pitch of 510 μm were obtained completely similarly to the above-described samples 1-1 to 4-14, 26-1 to 26-4, except that 32-inch liquid crystal panels (full high definition television) were used. Next, evaluation of moire fringes, and measurement of the front luminance and view angle were carried out similarly to those for the above-described samples 1-1 to 4-14, 26-1 to 26-4. Results are shown in Tables 7 and 8 and Tables 17 and 18.

<Sample 13-1 to 16-14, 26-13 to 26-16>

Nineteen-inch display devices were obtained completely similarly to the above-described samples 1-1 to 4-14, 26-1 to 26-4, except that the lens films having the hyperbolic cylindrical unit lenses are consecutively arranged in parallel on one main surface thereof were formed so as to adjust the lens pitches P thereof to the values shown in Table 9 and Table 17. Next, evaluation of moire fringes, and measurement of the front luminance and view angle were carried out similarly to those for the above-described samples 1-1 to 4-14, 26-1 to 26-4. Results are shown in Tables 9 and 10 and Tables 17 and 18.

<Samples 17-1 to 20-14, 26-17 to 26-20>

Forty-inch display devices were obtained completely similarly to the above-described samples 5-1 to 8-14, 26-5 to 26-8, except that the lens films having the hyperbolic cylindrical unit lenses are consecutively arranged in parallel on one main surface thereof were formed so as to adjust the lens pitches P thereof to the values shown in Table 12 and Table 17. Next, evaluation of moire fringes, and measurement of the front luminance and view angle were carried out similarly to those for the above-described samples 5-1 to 8-14, 26-5 to 26-8. Results are shown in Tables 11 and 12 and Tables 17 and 18.

<Samples 21-1 to 24-14, 26-21 to 26-24>

Thirty-two-inch display devices were obtained completely similarly to the above-described samples 9-1 to 12-14, 26-9 to 26-12, except that the lens films having the hyperbolic cylindrical unit lenses are consecutively arranged in parallel on one main surface thereof were formed so as to adjust the lens pitches P thereof to the values shown in Table 13 and Table 17. Next, evaluation of moire fringes, and measurement of the front luminance and view angle were carried out similarly to those for the above-described samples 9-1 to 12-14, 26-9 to 26-12. Results are shown in Tables 13 and 14 and Tables 17 and 18.

Characteristics of the diffusion film, the reflective polarizer (DBEFD) and tacky diffusion layer used for samples 1-1 to 26-24 are shown in Table 1 and Table 2. Haze H, total beam transmissivity Tt, diffused light Td and linear transmittance Tp shown in Table 1 and Table 2 were measured as described below.

Haze H: Measured using haze/transmittance meter HM-150 from Murakami Color Research Laboratory Co., Ltd. Of transmitted light coming out through the test piece, percentage of beam components which deflect 2.5° or more away from the incident beam by back scattering (the diffusion surface directed to the beam extraction side) was measured (conforming to JIS-K-7316 except for a method of setting samples).

Total beam transmissivity Tt: Measured using haze/transmittance meter HM-150 from Murakami Color Research Laboratory Co., Ltd. Of transmitted light coming out through the test piece, ratio of total transmitted flux of light to the flux of light of parallel incidence was measured (measured conforming to JIS-K-7316).

Linear Transmittance Tp: Measured using haze/transmittance meter HM-150 from Murakami Color Research Laboratory Co., Ltd. Of transmitted light coming out through the test piece, percentage of beam components which fall within the range smaller than 2.5° away from the flux of beam of parallel incidence was measured (conforming to a method of measuring haze under JIS-K-7316).

Diffused light Td: Determined as transmittance obtained by subtracting linear transmittance of the linear component from the total beam transmittance measured using haze/transmittance meter HM-150 from Murakami Color Research Laboratory Co., Ltd.

TABLE 1

Back Scattering Measured Values

| | Haze H (%) | Total Light Transmissivity Tt (%) | Diffused Light Td (%) | Linear Transmittance Tp (%) | H/Tt |
|---|---|---|---|---|---|
| Diffusion Film 1 | 99.7 | 35.4 | 35.3 | 0.1 | 2.82 |
| Diffusion Film 2 | 93.7 | 67.1 | 62.9 | 4.2 | 1.40 |
| Diffusion Film 3 | 95.1 | 68.3 | 65 | 3.3 | 1.39 |
| Diffusion Film 4 | 91 | 66.1 | 60.2 | 5.9 | 1.38 |
| Diffusion Film 5 | 95.2 | 71.1 | 67.6 | 3.5 | 1.34 |
| Diffusion Film 6 | 74.6 | 59.4 | 44.3 | 15.1 | 1.26 |
| Diffusion Film 7 | 90.1 | 89.4 | 80.6 | 8.8 | 1.01 |
| Diffusion Film 8 | 83.7 | 90.7 | 75.9 | 14.8 | 0.92 |
| Diffusion Film 9 | 60.1 | 90 | 54.1 | 35.9 | 0.67 |
| Diffusion Film 10 | 33.6 | 89.8 | 30.2 | 59.6 | 0.37 |
| Tacky Diffusion Layer 1 | 94.7 | 67.2 | 63.6 | 3.6 | 1.41 |
| Tacky Diffusion Layer 2 | 89.9 | 88.6 | 76.7 | 11.9 | 1.01 |

TABLE 1-continued

| | Back Scattering Measured Values | | | | |
|---|---|---|---|---|---|
| | Haze H (%) | Total Light Transmissivity Tt (%) | Diffused Light Td (%) | Linear Transmittance Tp (%) | H/Tt |
| Tacky Diffusion Layer 3 | 34.5 | 87.8 | 30.3 | 57.5 | 0.39 |
| DBEFD | 82.2 | 47.2 | 38.8 | 8.4 | 1.74 |

TABLE 2

| | Front Scattering Measured Values | | | | | |
|---|---|---|---|---|---|---|
| | Haze H (%) | Total Light Transmissivity Tt (%) | Diffused Light Td (%) | Linear Transmittance Tp (%) | H/Tt | Haze (Front Scattering-Back Scattering |
| Diffusion Film 1 | 99.6 | 34.7 | 34.6 | 0.1 | 2.87 | −0.1 |
| Diffusion Film 2 | 95.5 | 92.4 | 88.2 | 4.2 | 1.03 | 1.8 |
| Diffusion Film 3 | 96.4 | 93.4 | 90 | 3.4 | 1.03 | 1 |
| Diffusion Film 4 | 93.5 | 92.6 | 86.6 | 6.0 | 1.01 | 1.3 |
| Diffusion Film 5 | 96.2 | 93.1 | 89.5 | 3.6 | 1.03 | 2.5 |
| Diffusion Film 6 | 83.7 | 91.5 | 76.6 | 14.9 | 0.91 | −6.8 |
| Diffusion Film 7 | 90 | 91 | 81.9 | 9.1 | 0.99 | 0 |
| Diffusion Film 8 | 83.3 | 90.6 | 75.5 | 15.1 | 0.92 | 15.4 |
| Diffusion Film 9 | 59.9 | 89.8 | 53.8 | 36.0 | 0.67 | −0.2 |
| Diffusion Film 10 | 33.7 | 92.3 | 31.1 | 61.2 | 0.37 | 0.1 |
| Tacky Diffusion Layer 1 | 94.7 | 67.2 | 63.6 | 3.6 | 1.41 | 0 |
| Tacky Diffusion Layer 2 | 89.9 | 88.6 | 76.7 | 11.9 | 1.01 | 0 |
| Tacky Diffusion Layer 3 | 34.5 | 87.8 | 30.3 | 57.5 | 0.39 | 0 |
| DBEFD | 82.2 | 47.2 | 38.8 | 8.4 | 1.74 | 0 |

Results of evaluation of occurrence of moire fringes in samples 1-1 to 26-24 are shown in Table 3, Table 5, Table 7, Table 9, Table 11, Table 13, Table 15 and Table 17. Results of evaluation of the front luminance and view angle in sample 1-1 to 26-24 are shown in Table 4, Table 6, Table 8, Table 10, Table 12, Table 14, Table 16, Table 18.

TABLE 3

| | Film/Diffusion Layer Type | P (μM) | Pp/P (—) | (H/T) * (Pp/P) | Moire Evaluation |
|---|---|---|---|---|---|
| Sample 1-1 | Diffusion Film 1 | 50 | 6.4 | 18.02 | ○ |
| Sample 1-2 | Diffusion Film 2 | | | 8.94 | ○ |
| Sample 1-3 | Diffusion Film 3 | | | 8.91 | ○ |
| Sample 1-4 | Diffusion Film 4 | | | 8.81 | ○ |
| Sample 1-5 | Diffusion Film 5 | | | 8.57 | ○ |
| Sample 1-6 | Diffusion Film 6 | | | 8.04 | ○ |
| Sample 1-7 | Diffusion Film 7 | | | 6.45 | ○ |
| Sample 1-8 | Diffusion Film 8 | | | 5.91 | ○ |
| Sample 1-9 | Diffusion Film 9 | | | 4.27 | ○ |
| Sample 1-10 | Diffusion Film 10 | | | 2.39 | ○ |
| Sample 1-11 | Tacky Diffusion Layer 1 | | | 9.02 | ○ |
| Sample 1-12 | Tacky Diffusion Layer 2 | | | 6.49 | ○ |
| Sample 1-13 | Tacky Diffusion Layer 3 | | | 2.51 | ○ |
| Sample 1-14 | Diffusion Film 2 | 32 | 10 | 8.94 | ○ |
| Sample 1-15 | Diffusion Film 2 | 15 | 21.3 | 8.94 | ○ |
| Sample 2-1 | Diffusion Film 1 | 110 | 2.91 | 8.20 | ○ |
| Sample 2-2 | Diffusion Film 2 | | | 4.06 | ○ |
| Sample 2-3 | Diffusion Film 3 | | | 4.05 | ○ |

TABLE 3-continued

| | Film/Diffusion Layer Type | P (μM) | Pp/P (—) | (H/T) * (Pp/P) | Moire Evaluation |
|---|---|---|---|---|---|
| Sample 2-4 | Diffusion Film 4 | | | 4.01 | ○ |
| Sample 2-5 | Diffusion Film 5 | | | 3.90 | ○ |
| Sample 2-6 | Diffusion Film 6 | | | 3.65 | ○ |
| Sample 2-7 | Diffusion Film 7 | | | 2.93 | ○ |
| Sample 2-8 | Diffusion Film 8 | | | 2.69 | ○ |
| Sample 2-9 | Diffusion Film 9 | | | 1.94 | ○ |
| Sample 2-10 | Diffusion Film 10 | | | 1.09 | X |
| Sample 2-11 | Tacky Diffusion Layer 1 | | | 4.10 | ○ |
| Sample 2-12 | Tacky Diffusion Layer 2 | | | 2.95 | ○ |
| Sample 2-13 | Tacky Diffusion Layer 3 | | | 1.14 | X |
| Sample 3-1 | Diffusion Film 1 | 200 | 1.6 | 4.53 | ○ |
| Sample 3-2 | Diffusion Film 2 | | | 2.25 | ○ |
| Sample 3-3 | Diffusion Film 3 | | | 2.24 | ○ |
| Sample 3-4 | Diffusion Film 4 | | | 2.22 | ○ |
| Sample 3-5 | Diffusion Film 5 | | | 2.16 | ○ |
| Sample 3-6 | Diffusion Film 6 | | | 2.02 | ○ |
| Sample 3-7 | Diffusion Film 7 | | | 1.62 | ○ |
| Sample 3-8 | Diffusion Film 8 | | | 1.49 | X |
| Sample 3-9 | Diffusion Film 9 | | | 1.08 | X |
| Sample 3-10 | Diffusion Film 10 | | | 0.60 | X |
| Sample 3-11 | Tacky Diffusion Layer 1 | | | 2.27 | ○ |
| Sample 3-12 | Tacky Diffusion Layer 2 | | | 1.63 | ○ |
| Sample 3-13 | Tacky Diffusion Layer 3 | | | 0.63 | X |
| Sample 4-1 | Diffusion Film 1 | 350 | 0.91 | 2.56 | ○ |
| Sample 4-2 | Diffusion Film 2 | | | 1.27 | X |
| Sample 4-3 | Diffusion Film 3 | | | 1.27 | X |
| Sample 4-4 | Diffusion Film 4 | | | 1.25 | X |
| Sample 4-5 | Diffusion Film 5 | | | 1.22 | X |
| Sample 4-6 | Diffusion Film 6 | | | 1.14 | X |
| Sample 4-7 | Diffusion Film 7 | | | 0.92 | X |
| Sample 4-8 | Diffusion Film 8 | | | 0.84 | X |
| Sample 4-9 | Diffusion Film 9 | | | 0.61 | X |
| Sample 4-10 | Diffusion Film 10 | | | 0.34 | X |
| Sample 4-11 | Tacky Diffusion Layer 1 | | | 1.28 | X |
| Sample 4-12 | Tacky Diffusion Layer 2 | | | 0.92 | X |
| Sample 4-13 | Tacky Diffusion Layer 3 | | | 0.36 | X |

Pp: Pixel Pitch
P: Lens Width
H: Haze
T: Total Light Transmissivity Amount

TABLE 4

| | Film/Diffusion Layer Type | P (μm) | Pp/P (—) | Relative Front Luminance Value (%) | View Angle (degree) VAh | View Angle (degree) VAv |
|---|---|---|---|---|---|---|
| Sample 1-16 | No | 50 | 6.4 | 100 | 96 | 64 |
| Sample 1-1 | Diffusion Film 1 | | | 46 | 127 | 129 |
| Sample 1-2 | Diffusion Film 2 | | | 100 | 77 | 68 |
| Sample 1-3 | Diffusion Film 3 | | | 97 | 76 | 65 |
| Sample 1-4 | Diffusion Film 4 | | | 98 | 76 | 68 |
| Sample 1-5 | Diffusion Film 5 | | | 99 | 77 | 64 |
| Sample 1-6 | Diffusion Film 6 | | | 102 | 82 | 68 |
| Sample 1-7 | Diffusion Film 7 | | | 98 | 87 | 64 |
| Sample 1-8 | Diffusion Film 8 | | | 99 | 89 | 64 |
| Sample 1-9 | Diffusion Film 9 | | | 99 | 93 | 64 |
| Sample 1-10 | Diffusion Film 10 | | | 100 | 94 | 63 |
| Sample 1-11 | Tacky Diffusion Layer 1 | | | 98 | 74 | 63 |
| Sample 1-12 | Tacky Diffusion Layer 2 | | | 99 | 86 | 62 |
| Sample 1-13 | Tacky Diffusion Layer 3 | | | 100 | 92 | 61 |

TABLE 4-continued

| | Film/Diffusion Layer Type | P (μm) | Pp/P (—) | Relative Front Luminance Value (%) | View Angle (degree) VAh | View Angle (degree) VAv |
|---|---|---|---|---|---|---|
| Sample 1-14 | Diffusion Film 2 | 32 | 10 | 96 | 97 | 66 |
| Sample 1-15 | Diffusion Film 2 | 15 | 21.3 | 90 | 98 | 68 |
| Sample 2-14 | No | 110 | 2.91 | 100 | 94 | 61 |
| Sample 2-1 | Diffusion Film 1 | | | 48 | 127 | 127 |
| Sample 2-2 | Diffusion Film 2 | | | 103 | 76 | 67 |
| Sample 2-3 | Diffusion Film 3 | | | 100 | 77 | 68 |
| Sample 2-4 | Diffusion Film 4 | | | 101 | 75 | 68 |
| Sample 2-5 | Diffusion Film 5 | | | 102 | 78 | 66 |
| Sample 2-6 | Diffusion Film 6 | | | 104 | 82 | 68 |
| Sample 2-7 | Diffusion Film 7 | | | 101 | 86 | 64 |
| Sample 2-8 | Diffusion Film 8 | | | 102 | 87 | 62 |
| Sample 2-9 | Diffusion Film 9 | | | 102 | 91 | 61 |
| Sample 2-10 | Diffusion Film 10 | | | 103 | 92 | 62 |
| Sample 2-11 | Tacky Diffusion Layer 1 | | | 101 | 75 | 65 |
| Sample 2-12 | Tacky Diffusion Layer 2 | | | 102 | 85 | 63 |
| Sample 2-13 | Tacky Diffusion Layer 3 | | | 102 | 91 | 60 |
| Sample 3-14 | No | 200 | 1.6 | 102 | 95 | 61 |
| Sample 3-1 | Diffusion Film 1 | | | 51 | 127 | 127 |
| Sample 3-2 | Diffusion Film 2 | | | 104 | 76 | 67 |
| Sample 3-3 | Diffusion Film 3 | | | 103 | 77 | 68 |
| Sample 3-4 | Diffusion Film 4 | | | 103 | 75 | 68 |
| Sample 3-5 | Diffusion Film 5 | | | 103 | 78 | 66 |
| Sample 3-6 | Diffusion Film 6 | | | 106 | 81 | 68 |
| Sample 3-7 | Diffusion Film 7 | | | 103 | 86 | 64 |
| Sample 3-8 | Diffusion Film 8 | | | 103 | 87 | 62 |
| Sample 3-9 | Diffusion Film 9 | | | 104 | 92 | 61 |
| Sample 3-10 | Diffusion Film 10 | | | 105 | 92 | 62 |
| Sample 3-11 | Tacky Diffusion Layer 1 | | | 103 | 75 | 66 |
| Sample 3-12 | Tacky Diffusion Layer 2 | | | 104 | 86 | 62 |
| Sample 3-13 | Tacky Diffusion Layer 3 | | | 104 | 90 | 60 |
| Sample 4-14 | No | 350 | 0.91 | 104 | 95 | 63 |
| Sample 4-1 | Diffusion Film 1 | | | 53 | 127 | 128 |
| Sample 4-2 | Diffusion Film 2 | | | 105 | 76 | 66 |
| Sample 4-3 | Diffusion Film 3 | | | 104 | 75 | 65 |
| Sample 4-4 | Diffusion Film 4 | | | 103 | 74 | 66 |
| Sample 4-5 | Diffusion Film 5 | | | 104 | 77 | 63 |

TABLE 4-continued

| Film/Diffusion Layer Type | P (μm) | Pp/P (—) | Relative Front Luminance Value (%) | View Angle (degree) VAh | View Angle (degree) VAv |
|---|---|---|---|---|---|
| Sample 4-6 | Diffusion Film 6 | | | 108 | 82 | 67 |
| Sample 4-7 | Diffusion Film 7 | | | 104 | 85 | 63 |
| Sample 4-8 | Diffusion Film 8 | | | 104 | 88 | 61 |
| Sample 4-9 | Diffusion Film 9 | | | 105 | 92 | 63 |
| Sample 4-10 | Diffusion Film 10 | | | 106 | 93 | 63 |
| Sample 4-11 | Tacky Diffusion Layer 1 | | | 104 | 74 | 64 |
| Sample 4-12 | Tacky Diffusion Layer 2 | | | 104 | 84 | 62 |
| Sample 4-13 | Tacky Diffusion Layer 3 | | | 105 | 92 | 62 |

Pp: Pixel Pitch
P: Lens Width
VAh: View Angle in Horizontal Direction
VAv: View Angle in Vertical Direction

TABLE 5

| | Film/Diffusion Layer Type | P (μm) | Pp/P (—) | (H/T) * (Pp/P) | Moire Evaluation |
|---|---|---|---|---|---|
| Sample 5-1 | Diffusion Film 1 | 50 | 9.2 | 25.91 | ○ |
| Sample 5-2 | Diffusion Film 2 | | | 12.85 | ○ |
| Sample 5-3 | Diffusion Film 3 | | | 12.81 | ○ |
| Sample 5-4 | Diffusion Film 4 | | | 12.67 | ○ |
| Sample 5-5 | Diffusion Film 5 | | | 12.32 | ○ |
| Sample 5-6 | Diffusion Film 6 | | | 11.55 | ○ |
| Sample 5-7 | Diffusion Film 7 | | | 9.27 | ○ |
| Sample 5-8 | Diffusion Film 8 | | | 8.49 | ○ |
| Sample 5-9 | Diffusion Film 9 | | | 6.14 | ○ |
| Sample 5-10 | Diffusion Film 10 | | | 3.44 | ○ |
| Sample 5-11 | Tacky Diffusion Layer 1 | | | 12.96 | ○ |
| Sample 5-12 | Tacky Diffusion Layer 2 | | | 9.33 | ○ |
| Sample 5-13 | Tacky Diffusion Layer 3 | | | 3.62 | ○ |
| Sample 6-1 | Diffusion Film 1 | 110 | 4.18 | 11.77 | ○ |
| Sample 6-2 | Diffusion Film 2 | | | 5.84 | ○ |
| Sample 6-3 | Diffusion Film 3 | | | 5.82 | ○ |
| Sample 6-4 | Diffusion Film 4 | | | 5.75 | ○ |
| Sample 6-5 | Diffusion Film 5 | | | 5.60 | ○ |
| Sample 6-6 | Diffusion Film 6 | | | 5.25 | ○ |
| Sample 6-7 | Diffusion Film 7 | | | 4.21 | ○ |
| Sample 6-8 | Diffusion Film 8 | | | 3.86 | ○ |
| Sample 6-9 | Diffusion Film 9 | | | 2.79 | ○ |
| Sample 6-10 | Diffusion Film 10 | | | 1.56 | X |
| Sample 6-11 | Tacky Diffusion Layer 1 | | | 5.89 | ○ |
| Sample 6-12 | Tacky Diffusion Layer 2 | | | 4.24 | ○ |
| Sample 6-13 | Tacky Diffusion Layer 3 | | | 1.64 | ○ |
| Sample 7-1 | Diffusion Film 1 | 200 | 2.3 | 6.48 | ○ |
| Sample 7-2 | Diffusion Film 2 | | | 3.21 | ○ |
| Sample 7-3 | Diffusion Film 3 | | | 3.20 | ○ |
| Sample 7-4 | Diffusion Film 4 | | | 3.17 | ○ |
| Sample 7-5 | Diffusion Film 5 | | | 3.08 | ○ |
| Sample 7-6 | Diffusion Film 6 | | | 2.89 | ○ |
| Sample 7-7 | Diffusion Film 7 | | | 2.32 | ○ |
| Sample 7-8 | Diffusion Film 8 | | | 2.12 | ○ |
| Sample 7-9 | Diffusion Film 9 | | | 1.54 | X |
| Sample 7-10 | Diffusion Film 10 | | | 0.86 | X |
| Sample 7-11 | Tacky Diffusion Layer 1 | | | 3.24 | ○ |
| Sample 7-12 | Tacky Diffusion Layer 2 | | | 2.33 | ○ |
| Sample 7-13 | Tacky Diffusion Layer 3 | | | 0.90 | X |
| Sample 8-1 | Diffusion Film 1 | 350 | 1.31 | 3.60 | ○ |
| Sample 8-2 | Diffusion Film 2 | | | 1.79 | ○ |
| Sample 8-3 | Diffusion Film 3 | | | 1.78 | ○ |
| Sample 8-4 | Diffusion Film 4 | | | 1.76 | ○ |
| Sample 8-5 | Diffusion Film 5 | | | 1.71 | ○ |
| Sample 8-6 | Diffusion Film 6 | | | 1.61 | ○ |
| Sample 8-7 | Diffusion Film 7 | | | 1.29 | X |

TABLE 5-continued

| Film/Diffusion Layer Type | | P (μm) | Pp/P (—) | (H/T) * (Pp/P) | Moire Evaluation |
|---|---|---|---|---|---|
| Sample 8-8 | Diffusion Film 8 | | | 1.18 | X |
| Sample 8-9 | Diffusion Film 9 | | | 0.85 | X |
| Sample 8-10 | Diffusion Film 10 | | | 0.48 | X |
| Sample 8-11 | Tacky Diffusion Layer 1 | | | 1.80 | ◯ |
| Sample 8-12 | Tacky Diffusion Layer 2 | | | 1.30 | X |
| Sample 8-13 | Tacky Diffusion Layer 3 | | | 0.50 | X |

Pp: Pixel Pitch
P: Lens Width
H: Haze
T: Total Light Transmissivity Amount

TABLE 6

| | Film/Diffusion Layer Type | P (μm) | Pp/P (—) | Relative Front Luminance Value (%) | View Angle (degree) | |
|---|---|---|---|---|---|---|
| | | | | | VAh | VAv |
| Sample 5-14 | No | 50 | 9.2 | 100 | 95 | 63 |
| Sample 5-1 | Diffusion Film 1 | | | 47 | 126 | 128 |
| Sample 5-2 | Diffusion Film 2 | | | 101 | 76 | 67 |
| Sample 5-3 | Diffusion Film 3 | | | 98 | 75 | 66 |
| Sample 5-4 | Diffusion Film 4 | | | 99 | 76 | 69 |
| Sample 5-5 | Diffusion Film 5 | | | 99 | 76 | 65 |
| Sample 5-6 | Diffusion Film 6 | | | 104 | 81 | 69 |
| Sample 5-7 | Diffusion Film 7 | | | 99 | 86 | 65 |
| Sample 5-8 | Diffusion Film 8 | | | 99 | 88 | 64 |
| Sample 5-9 | Diffusion Film 9 | | | 100 | 91 | 64 |
| Sample 5-10 | Diffusion Film 10 | | | 101 | 93 | 64 |
| Sample 5-11 | Tacky Diffusion Layer 1 | | | 99 | 74 | 63 |
| Sample 5-12 | Tacky Diffusion Layer 2 | | | 99 | 86 | 62 |
| Sample 5-13 | Tacky Diffusion Layer 3 | | | 101 | 92 | 61 |
| Sample 6-14 | No | 110 | 4.18 | 103 | 93 | 62 |
| Sample 6-1 | Diffusion Film 1 | | | 48 | 126 | 126 |
| Sample 6-2 | Diffusion Film 2 | | | 103 | 75 | 68 |
| Sample 6-3 | Diffusion Film 3 | | | 101 | 76 | 67 |
| Sample 6-4 | Diffusion Film 4 | | | 102 | 74 | 66 |
| Sample 6-5 | Diffusion Film 5 | | | 102 | 77 | 65 |
| Sample 6-6 | Diffusion Film 6 | | | 106 | 82 | 67 |
| Sample 6-7 | Diffusion Film 7 | | | 102 | 85 | 63 |
| Sample 6-8 | Diffusion Film 8 | | | 102 | 86 | 63 |
| Sample 6-9 | Diffusion Film 9 | | | 102 | 90 | 62 |
| Sample 6-10 | Diffusion Film 10 | | | 103 | 92 | 62 |
| Sample 6-11 | Tacky Diffusion Layer 1 | | | 102 | 75 | 65 |
| Sample 6-12 | Tacky Diffusion Layer 2 | | | 102 | 85 | 63 |
| Sample 6-13 | Tacky Diffusion Layer 3 | | | 103 | 91 | 60 |
| Sample 7-14 | No | 200 | 2.3 | 104 | 94 | 60 |

TABLE 6-continued

| | Film/Diffusion Layer Type | P (μm) | Pp/P (—) | Relative Front Luminance Value (%) | View Angle (degree) VAh | View Angle (degree) VAv |
|---|---|---|---|---|---|---|
| Sample 7-1 | Diffusion Film 1 | | | 52 | 126 | 127 |
| Sample 7-2 | Diffusion Film 2 | | | 104 | 75 | 66 |
| Sample 7-3 | Diffusion Film 3 | | | 102 | 76 | 67 |
| Sample 7-4 | Diffusion Film 4 | | | 103 | 74 | 67 |
| Sample 7-5 | Diffusion Film 5 | | | 103 | 78 | 65 |
| Sample 7-6 | Diffusion Film 6 | | | 107 | 82 | 67 |
| Sample 7-7 | Diffusion Film 7 | | | 102 | 87 | 63 |
| Sample 7-8 | Diffusion Film 8 | | | 102 | 86 | 63 |
| Sample 7-9 | Diffusion Film 9 | | | 104 | 91 | 62 |
| Sample 7-10 | Diffusion Film 10 | | | 105 | 93 | 63 |
| Sample 7-11 | Tacky Diffusion Layer 1 | | | 103 | 75 | 66 |
| Sample 7-12 | Tacky Diffusion Layer 2 | | | 103 | 86 | 62 |
| Sample 7-13 | Tacky Diffusion Layer 3 | | | 104 | 90 | 60 |
| Sample 8-14 | No | 350 | 1.31 | 105 | 96 | 64 |
| Sample 8-1 | Diffusion Film 1 | | | 53 | 126 | 127 |
| Sample 8-2 | Diffusion Film 2 | | | 105 | 75 | 65 |
| Sample 8-3 | Diffusion Film 3 | | | 104 | 76 | 65 |
| Sample 8-4 | Diffusion Film 4 | | | 104 | 75 | 65 |
| Sample 8-5 | Diffusion Film 5 | | | 104 | 76 | 64 |
| Sample 8-6 | Diffusion Film 6 | | | 108 | 81 | 66 |
| Sample 8-7 | Diffusion Film 7 | | | 104 | 85 | 64 |
| Sample 8-8 | Diffusion Film 8 | | | 103 | 88 | 62 |
| Sample 8-9 | Diffusion Film 9 | | | 105 | 91 | 62 |
| Sample 8-10 | Diffusion Film 10 | | | 106 | 93 | 62 |
| Sample 8-11 | Tacky Diffusion Layer 1 | | | 104 | 74 | 64 |
| Sample 8-12 | Tacky Diffusion Layer 2 | | | 104 | 84 | 62 |
| Sample 8-13 | Tacky Diffusion Layer 3 | | | 105 | 92 | 62 |

Pp: Pixel Pitch
P: Lens Width
VAh: View Angle in Horizontal Direction
VAv: View Angle in Vertical Direction

TABLE 7

| | Film/Diffusion Layer Type | P (μm) | Pp/P (—) | (H/T) * (Pp/P) | Moire Evaluation |
|---|---|---|---|---|---|
| Sample 9-1 | Diffusion Film 1 | 50 | 10.2 | 28.73 | ○ |
| Sample 9-2 | Diffusion Film 2 | | | 14.24 | ○ |
| Sample 9-3 | Diffusion Film 3 | | | 14.20 | ○ |
| Sample 9-4 | Diffusion Film 4 | | | 14.04 | ○ |
| Sample 9-5 | Diffusion Film 5 | | | 13.66 | ○ |
| Sample 9-6 | Diffusion Film 6 | | | 12.81 | ○ |
| Sample 9-7 | Diffusion Film 7 | | | 10.28 | ○ |
| Sample 9-8 | Diffusion Film 8 | | | 9.41 | ○ |

TABLE 7-continued

| | Film/Diffusion Layer Type | P (μm) | Pp/P (—) | (H/T) * (Pp/P) | Moire Evaluation |
|---|---|---|---|---|---|
| Sample 9-9 | Diffusion Film 9 | | | 6.81 | ○ |
| Sample 9-10 | Diffusion Film 10 | | | 3.82 | ○ |
| Sample 9-11 | Tacky Diffusion Layer 1 | | | 14.37 | ○ |
| Sample 9-12 | Tacky Diffusion Layer 2 | | | 10.35 | ○ |
| Sample 9-13 | Tacky Diffusion Layer 3 | | | 4.01 | ○ |
| Sample 10-1 | Diffusion Film 1 | 110 | 4.64 | 13.04 | ○ |
| Sample 10-2 | Diffusion Film 2 | | | 6.47 | ○ |
| Sample 10-3 | Diffusion Film 3 | | | 6.45 | ○ |
| Sample 10-4 | Diffusion Film 4 | | | 6.37 | ○ |
| Sample 10-5 | Diffusion Film 5 | | | 6.20 | ○ |
| Sample 10-6 | Diffusion Film 6 | | | 5.81 | ○ |
| Sample 10-7 | Diffusion Film 7 | | | 4.67 | ○ |
| Sample 10-8 | Diffusion Film 8 | | | 4.27 | ○ |
| Sample 10-9 | Diffusion Film 9 | | | 3.09 | ○ |
| Sample 10-10 | Diffusion Film 10 | | | 1.73 | ○ |
| Sample 10-11 | Tacky Diffusion Layer 1 | | | 6.52 | ○ |
| Sample 10-12 | Tacky Diffusion Layer 2 | | | 4.70 | ○ |
| Sample 10-13 | Tacky Diffusion Layer 3 | | | 1.82 | ○ |
| Sample 11-1 | Diffusion Film 1 | 200 | 2.55 | 6.48 | ○ |
| Sample 11-2 | Diffusion Film 2 | | | 3.21 | ○ |
| Sample 11-3 | Diffusion Film 3 | | | 3.20 | ○ |
| Sample 11-4 | Diffusion Film 4 | | | 3.17 | ○ |
| Sample 11-5 | Diffusion Film 5 | | | 3.08 | ○ |
| Sample 11-6 | Diffusion Film 6 | | | 2.89 | ○ |
| Sample 11-7 | Diffusion Film 7 | | | 2.32 | ○ |
| Sample 11-8 | Diffusion Film 8 | | | 2.12 | ○ |
| Sample 11-9 | Diffusion Film 9 | | | 1.54 | X |
| Sample 11-10 | Diffusion Film 10 | | | 0.86 | X |
| Sample 11-11 | Tacky Diffusion Layer 1 | | | 3.24 | ○ |
| Sample 11-12 | Tacky Diffusion Layer 2 | | | 2.33 | ○ |
| Sample 11-13 | Tacky Diffusion Layer 3 | | | 0.90 | X |
| Sample 12-1 | Diffusion Film 1 | 350 | 1.46 | 4.00 | ○ |
| Sample 12-2 | Diffusion Film 2 | | | 1.98 | ○ |
| Sample 12-3 | Diffusion Film 3 | | | 1.98 | ○ |
| Sample 12-4 | Diffusion Film 4 | | | 1.95 | ○ |
| Sample 12-5 | Diffusion Film 5 | | | 1.90 | ○ |
| Sample 12-6 | Diffusion Film 6 | | | 1.78 | ○ |
| Sample 12-7 | Diffusion Film 7 | | | 1.43 | X |
| Sample 12-8 | Diffusion Film 8 | | | 1.31 | X |
| Sample 12-9 | Diffusion Film 9 | | | 0.95 | X |
| Sample 12-10 | Diffusion Film 10 | | | 0.53 | X |
| Sample 12-11 | Tacky Diffusion Layer 1 | | | 2.00 | ○ |
| Sample 12-12 | Tacky Diffusion Layer 2 | | | 1.44 | X |
| Sample 12-13 | Tacky Diffusion Layer 3 | | | 0.56 | X |

Pp: Pixel Pitch
P: Lens Width
H: Haze
T: Total Light Transmissivity Amount

TABLE 8

| | Film/Diffusion Layer Type | P (μm) | Pp/P (—) | Relative Front Luminance Value (%) | View Angle (degree) VAh | View Angle (degree) VAv |
|---|---|---|---|---|---|---|
| Sample 9-14 | No | 50 | 10.2 | 100 | 95 | 63 |
| Sample 9-1 | Diffusion Film 1 | | | 48 | 126 | 127 |
| Sample 9-2 | Diffusion Film 2 | | | 102 | 77 | 66 |
| Sample 9-3 | Diffusion Film 3 | | | 100 | 76 | 65 |
| Sample 9-4 | Diffusion Film 4 | | | 99 | 75 | 66 |
| Sample 9-5 | Diffusion Film 5 | | | 100 | 76 | 67 |
| Sample 9-6 | Diffusion Film 6 | | | 101 | 83 | 64 |
| Sample 9-7 | Diffusion Film 7 | | | 100 | 89 | 63 |
| Sample 9-8 | Diffusion Film 8 | | | 99 | 82 | 68 |
| Sample 9-9 | Diffusion Film 9 | | | 101 | 92 | 64 |

TABLE 8-continued

|  | Film/Diffusion Layer Type | P (μm) | Pp/P (—) | Relative Front Luminance Value (%) | View Angle (degree) VAh | View Angle (degree) VAv |
|---|---|---|---|---|---|---|
| Sample 9-10 | Diffusion Film 10 |  |  | 102 | 95 | 63 |
| Sample 9-11 | Tacky Diffusion Layer 1 |  |  | 100 | 74 | 63 |
| Sample 9-12 | Tacky Diffusion Layer 2 |  |  | 101 | 86 | 62 |
| Sample 9-13 | Tacky Diffusion Layer 3 |  |  | 101 | 92 | 61 |
| Sample 10-14 | No | 110 | 4.63 | 103 | 94 | 62 |
| Sample 10-1 | Diffusion Film 1 |  |  | 50 | 128 | 127 |
| Sample 10-2 | Diffusion Film 2 |  |  | 104 | 77 | 68 |
| Sample 10-3 | Diffusion Film 3 |  |  | 102 | 77 | 66 |
| Sample 10-4 | Diffusion Film 4 |  |  | 102 | 78 | 67 |
| Sample 10-5 | Diffusion Film 5 |  |  | 102 | 76 | 67 |
| Sample 10-6 | Diffusion Film 6 |  |  | 103 | 87 | 63 |
| Sample 10-7 | Diffusion Film 7 |  |  | 102 | 86 | 63 |
| Sample 10-8 | Diffusion Film 8 |  |  | 102 | 83 | 67 |
| Sample 10-9 | Diffusion Film 9 |  |  | 102 | 90 | 62 |
| Sample 10-10 | Diffusion Film 10 |  |  | 104 | 92 | 63 |
| Sample 10-11 | Tacky Diffusion Layer 1 |  |  | 102 | 75 | 65 |
| Sample 10-12 | Tacky Diffusion Layer 2 |  |  | 102 | 85 | 63 |
| Sample 10-13 | Tacky Diffusion Layer 3 |  |  | 103 | 91 | 60 |
| Sample 11-14 | No | 200 | 2.55 | 104 | 94 | 61 |
| Sample 11-1 | Diffusion Film 1 |  |  | 52 | 127 | 127 |
| Sample 11-2 | Diffusion Film 2 |  |  | 105 | 75 | 67 |
| Sample 11-3 | Diffusion Film 3 |  |  | 103 | 77 | 66 |
| Sample 11-4 | Diffusion Film 4 |  |  | 104 | 76 | 68 |
| Sample 11-5 | Diffusion Film 5 |  |  | 103 | 75 | 68 |
| Sample 11-6 | Diffusion Film 6 |  |  | 106 | 86 | 64 |
| Sample 11-7 | Diffusion Film 7 |  |  | 103 | 87 | 62 |
| Sample 11-8 | Diffusion Film 8 |  |  | 104 | 82 | 68 |
| Sample 11-9 | Diffusion Film 9 |  |  | 104 | 92 | 61 |
| Sample 11-10 | Diffusion Film 10 |  |  | 105 | 92 | 62 |
| Sample 11-11 | Tacky Diffusion Layer 1 |  |  | 103 | 75 | 66 |
| Sample 11-12 | Tacky Diffusion Layer 2 |  |  | 103 | 86 | 62 |
| Sample 11-13 | Tacky Diffusion Layer 3 |  |  | 104 | 90 | 60 |
| Sample 12-14 | No | 350 | 1.46 | 105 | 95 | 63 |
| Sample 12-1 | Diffusion Film 1 |  |  | 54 | 127 | 128 |
| Sample 12-2 | Diffusion Film 2 |  |  | 105 | 76 | 66 |
| Sample 12-3 | Diffusion Film 3 |  |  | 104 | 77 | 63 |

TABLE 8-continued

|  | Film/Diffusion Layer Type | P (µm) | Pp/P (—) | Relative Front Luminance Value (%) | View Angle (degree) VAh | View Angle (degree) VAv |
|---|---|---|---|---|---|---|
| Sample 12-4 | Diffusion Film 4 |  |  | 104 | 75 | 65 |
| Sample 12-5 | Diffusion Film 5 |  |  | 104 | 74 | 66 |
| Sample 12-6 | Diffusion Film 6 |  |  | 107 | 85 | 63 |
| Sample 12-7 | Diffusion Film 7 |  |  | 104 | 88 | 61 |
| Sample 12-8 | Diffusion Film 8 |  |  | 106 | 81 | 67 |
| Sample 12-9 | Diffusion Film 9 |  |  | 105 | 92 | 63 |
| Sample 12-10 | Diffusion Film 10 |  |  | 106 | 93 | 63 |
| Sample 12-11 | Tacky Diffusion Layer 1 |  |  | 104 | 74 | 64 |
| Sample 12-12 | Tacky Diffusion Layer 2 |  |  | 104 | 84 | 62 |
| Sample 12-13 | Tacky Diffusion Layer 3 |  |  | 105 | 92 | 62 |

Pp: Pixel Pitch
P: Lens Width
VAh: View Angle in Horizontal Direction
VAv: View Angle in Vertical Direction

TABLE 9

|  | Film/Diffusion Layer Type | P (µm) | Pp/P (—) | (H/T) * (Pp/P) | Moire Evaluation |
|---|---|---|---|---|---|
| Sample 13-1 | Diffusion Film 1 | 50 | 6.4 | 18.02 | ○ |
| Sample 13-2 | Diffusion Film 2 |  |  | 8.94 | ○ |
| Sample 13-3 | Diffusion Film 3 |  |  | 8.91 | ○ |
| Sample 13-4 | Diffusion Film 4 |  |  | 8.81 | ○ |
| Sample 13-5 | Diffusion Film 5 |  |  | 8.57 | ○ |
| Sample 13-6 | Diffusion Film 6 |  |  | 8.04 | ○ |
| Sample 13-7 | Diffusion Film 7 |  |  | 6.45 | ○ |
| Sample 13-8 | Diffusion Film 8 |  |  | 5.91 | ○ |
| Sample 13-9 | Diffusion Film 9 |  |  | 4.27 | ○ |
| Sample 13-10 | Diffusion Film 10 |  |  | 2.39 | ○ |
| Sample 13-11 | Tacky Diffusion Layer 1 |  |  | 9.02 | ○ |
| Sample 13-12 | Tacky Diffusion Layer 2 |  |  | 6.49 | ○ |
| Sample 13-13 | Tacky Diffusion Layer 3 |  |  | 2.51 | ○ |
| Sample 13-14 | Diffusion Film 2 | 32 | 10 | 8.94 | ○ |
| Sample 13-15 | Diffusion Film 2 | 15 | 21.3 | 8.94 | ○ |
| Sample 14-1 | Diffusion Film 1 | 110 | 2.91 | 8.20 | ○ |
| Sample 14-2 | Diffusion Film 2 |  |  | 4.06 | ○ |
| Sample 14-3 | Diffusion Film 3 |  |  | 4.05 | ○ |
| Sample 14-4 | Diffusion Film 4 |  |  | 4.01 | ○ |
| Sample 14-5 | Diffusion Film 5 |  |  | 3.90 | ○ |
| Sample 14-6 | Diffusion Film 6 |  |  | 3.65 | ○ |
| Sample 14-7 | Diffusion Film 7 |  |  | 2.93 | ○ |
| Sample 14-8 | Diffusion Film 8 |  |  | 2.69 | ○ |
| Sample 14-9 | Diffusion Film 9 |  |  | 1.94 | ○ |
| Sample 14-10 | Diffusion Film 10 |  |  | 1.09 | X |
| Sample 14-11 | Tacky Diffusion Layer 1 |  |  | 4.10 | ○ |
| Sample 14-12 | Tacky Diffusion Layer 2 |  |  | 2.95 | ○ |
| Sample 14-13 | Tacky Diffusion Layer 3 |  |  | 1.14 | X |
| Sample 15-1 | Diffusion Film 1 | 200 | 1.6 | 453 | ○ |
| Sample 15-2 | Diffusion Film 2 |  |  | 2.25 | ○ |
| Sample 15-3 | Diffusion Film 3 |  |  | 2.24 | ○ |
| Sample 15-4 | Diffusion Film 4 |  |  | 2.22 | ○ |
| Sample 15-5 | Diffusion Film 5 |  |  | 2.16 | ○ |
| Sample 15-6 | Diffusion Film 6 |  |  | 2.02 | ○ |
| Sample 15-7 | Diffusion Film 7 |  |  | 1.62 | ○ |
| Sample 15-8 | Diffusion Film 8 |  |  | 1.49 | X |
| Sample 15-9 | Diffusion Film 9 |  |  | 1.08 | X |
| Sample 15-10 | Diffusion Film 10 |  |  | 0.60 | X |
| Sample 15-11 | Tacky Diffusion Layer 1 |  |  | 2.27 | ○ |
| Sample 15-12 | Tacky Diffusion Layer 2 |  |  | 1.63 | ○ |
| Sample 15-13 | Tacky Diffusion Layer 3 |  |  | 0.63 | X |
| Sample 16-1 | Diffusion Film 1 | 350 | 0.91 | 2.56 | ○ |

TABLE 9-continued

| | Film/Diffusion Layer Type | P (μm) | Pp/P (—) | (H/T) * (Pp/P) | Moire Evaluation |
|---|---|---|---|---|---|
| Sample 16-2 | Diffusion Film 2 | | | 1.27 | X |
| Sample 16-3 | Diffusion Film 3 | | | 1.27 | X |
| Sample 16-4 | Diffusion Film 4 | | | 1.25 | X |
| Sample 16-5 | Diffusion Film 5 | | | 1.22 | X |
| Sample 16-6 | Diffusion Film 6 | | | 1.14 | X |
| Sample 16-7 | Diffusion Film 7 | | | 0.92 | X |
| Sample 16-8 | Diffusion Film 8 | | | 0.84 | X |
| Sample 16-9 | Diffusion Film 9 | | | 0.61 | X |
| Sample 16-10 | Diffusion Film 10 | | | 0.34 | X |
| Sample 16-11 | Tacky Diffusion Layer 1 | | | 1.28 | X |
| Sample 16-12 | Tacky Diffusion Layer 2 | | | 0.92 | X |
| Sample 16-13 | Tacky Diffusion Layer 3 | | | 0.36 | X |

Pp: Pixel Pitch
P: Lens Width
H: Haze
T: Total Light Transmissivity Amount

TABLE 10

| | Film/Diffusion Layer Type | P (μm) | Pp/P (—) | Relative Front Luminance Value (%) | View Angle (degree) VAh | View Angle (degree) VAv |
|---|---|---|---|---|---|---|
| Sample 13-16 | No | 50 | 6.4 | 94 | 104 | 71 |
| Sample 13-1 | Diffusion Film 1 | | | 43 | 127 | 128 |
| Sample 13-2 | Diffusion Film 2 | | | 94 | 85 | 73 |
| Sample 13-3 | Diffusion Film 3 | | | 95 | 84 | 71 |
| Sample 13-4 | Diffusion Film 4 | | | 93 | 83 | 71 |
| Sample 13-5 | Diffusion Film 5 | | | 92 | 86 | 71 |
| Sample 13-6 | Diffusion Film 6 | | | 98 | 87 | 71 |
| Sample 13-7 | Diffusion Film 7 | | | 94 | 97 | 75 |
| Sample 13-8 | Diffusion Film 8 | | | 93 | 99 | 72 |
| Sample 13-9 | Diffusion Film 9 | | | 93 | 103 | 72 |
| Sample 13-10 | Diffusion Film 10 | | | 95 | 103 | 72 |
| Sample 13-11 | Tacky Diffusion Layer 1 | | | 96 | 74 | 63 |
| Sample 13-12 | Tacky Diffusion Layer 2 | | | 95 | 86 | 62 |
| Sample 13-13 | Tacky Diffusion Layer 3 | | | 94 | 92 | 61 |
| Sample 13-14 | Diffusion Film 2 | 32 | 10 | 90 | 105 | 72 |
| Sample 13-15 | Diffusion Film 2 | 15 | 21.3 | 84 | 106 | 74 |
| Sample 14-14 | No | 110 | 2.91 | 97 | 101 | 71 |
| Sample 14-1 | Diffusion Film 1 | | | 46 | 127 | 128 |
| Sample 14-2 | Diffusion Film 2 | | | 97 | 84 | 72 |
| Sample 14-3 | Diffusion Film 3 | | | 97 | 83 | 71 |
| Sample 14-4 | Diffusion Film 4 | | | 96 | 83 | 73 |
| Sample 14-5 | Diffusion Film 5 | | | 95 | 85 | 72 |
| Sample 14-6 | Diffusion Film 6 | | | 100 | 86 | 72 |
| Sample 14-7 | Diffusion Film 7 | | | 96 | 95 | 74 |
| Sample 14-8 | Diffusion Film 8 | | | 96 | 97 | 72 |
| Sample 14-9 | Diffusion Film 9 | | | 95 | 101 | 71 |

TABLE 10-continued

| | Film/Diffusion Layer Type | P (μm) | Pp/P (—) | Relative Front Luminance Value (%) | View Angle (degree) VAh | View Angle (degree) VAv |
|---|---|---|---|---|---|---|
| Sample 14-10 | Diffusion Film 10 | | | 97 | 101 | 71 |
| Sample 14-11 | Tacky Diffusion Layer 1 | | | 98 | 75 | 65 |
| Sample 14-12 | Tacky Diffusion Layer 2 | | | 97 | 85 | 63 |
| Sample 14-13 | Tacky Diffusion Layer 3 | | | 96 | 91 | 60 |
| Sample 15-14 | No | 200 | 1.6 | 99 | 98 | 65 |
| Sample 15-1 | Diffusion Film 1 | | | 48 | 127 | 127 |
| Sample 15-2 | Diffusion Film 2 | | | 98 | 77 | 67 |
| Sample 15-3 | Diffusion Film 3 | | | 98 | 78 | 64 |
| Sample 15-4 | Diffusion Film 4 | | | 98 | 77 | 66 |
| Sample 15-5 | Diffusion Film 5 | | | 98 | 80 | 65 |
| Sample 15-6 | Diffusion Film 6 | | | 101 | 82 | 68 |
| Sample 15-7 | Diffusion Film 7 | | | 98 | 88 | 66 |
| Sample 15-8 | Diffusion Film 8 | | | 98 | 90 | 64 |
| Sample 15-9 | Diffusion Film 9 | | | 97 | 95 | 65 |
| Sample 15-10 | Diffusion Film 10 | | | 98 | 95 | 65 |
| Sample 15-11 | Tacky Diffusion Layer 1 | | | 99 | 75 | 66 |
| Sample 15-12 | Tacky Diffusion Layer 2 | | | 98 | 86 | 62 |
| Sample 15-13 | Tacky Diffusion Layer 3 | | | 98 | 90 | 60 |
| Sample 16-14 | No | 350 | 0.91 | 99 | 96 | 63 |
| Sample 16-1 | Diffusion Film 1 | | | 49 | 127 | 127 |
| Sample 16-2 | Diffusion Film 2 | | | 99 | 76 | 66 |
| Sample 16-3 | Diffusion Film 3 | | | 99 | 75 | 64 |
| Sample 16-4 | Diffusion Film 4 | | | 99 | 75 | 66 |
| Sample 16-5 | Diffusion Film 5 | | | 99 | 77 | 63 |
| Sample 16-6 | Diffusion Film 6 | | | 103 | 81 | 67 |
| Sample 16-7 | Diffusion Film 7 | | | 99 | 86 | 64 |
| Sample 16-8 | Diffusion Film 8 | | | 99 | 88 | 62 |
| Sample 16-9 | Diffusion Film 9 | | | 98 | 92 | 63 |
| Sample 16-10 | Diffusion Film 10 | | | 99 | 93 | 63 |
| Sample 16-11 | Tacky Diffusion Layer 1 | | | 99 | 74 | 64 |
| Sample 16-12 | Tacky Diffusion Layer 2 | | | 99 | 84 | 62 |
| Sample 16-13 | Tacky Diffusion Layer 3 | | | 99 | 92 | 62 |

Pp: Pixel Pitch
P: Lens Width
VAh: View Angle in Horizontal Direction
VAv: View Angle in Vertical Direction

TABLE 11

| Film/Diffusion Layer Type | P (μm) | Pp/P (—) | (H/T) * (Pp/P) | Moire Evaluation |
|---|---|---|---|---|
| Sample 17-1 | Diffusion Film 1 | 50 | 9.2 | 25.91 | ○ |
| Sample 17-2 | Diffusion Film 2 | | | 12.85 | ○ |
| Sample 17-3 | Diffusion Film 3 | | | 12.81 | ○ |
| Sample 17-4 | Diffusion Film 4 | | | 12.67 | ○ |
| Sample 17-5 | Diffusion Film 5 | | | 12.32 | ○ |
| Sample 17-6 | Diffusion Film 6 | | | 11.55 | ○ |
| Sample 17-7 | Diffusion Film 7 | | | 9.27 | ○ |
| Sample 17-8 | Diffusion Film 8 | | | 8.49 | ○ |
| Sample 17-9 | Diffusion Film 9 | | | 6.14 | ○ |
| Sample 17-10 | Diffusion Film 10 | | | 3.44 | ○ |
| Sample 17-11 | Tacky Diffusion Layer 1 | | | 12.96 | ○ |
| Sample 17-12 | Tacky Diffusion Layer 2 | | | 9.33 | ○ |
| Sample 17-13 | Tacky Diffusion Layer 3 | | | 3.62 | ○ |
| Sample 18-1 | Diffusion Film 1 | 110 | 4.18 | 11.77 | ○ |
| Sample 18-2 | Diffusion Film 2 | | | 5.84 | ○ |
| Sample 18-3 | Diffusion Film 3 | | | 5.82 | ○ |
| Sample 18-4 | Diffusion Film 4 | | | 5.75 | ○ |
| Sample 18-5 | Diffusion Film 5 | | | 5.60 | ○ |
| Sample 18-6 | Diffusion Film 6 | | | 5.25 | ○ |
| Sample 18-7 | Diffusion Film 7 | | | 4.21 | ○ |
| Sample 18-8 | Diffusion Film 8 | | | 3.86 | ○ |
| Sample 18-9 | Diffusion Film 9 | | | 2.79 | ○ |
| Sample 18-10 | Diffusion Film 10 | | | 1.56 | X |
| Sample 18-11 | Tacky Diffusion Layer 1 | | | 5.89 | ○ |
| Sample 18-12 | Tacky Diffusion Layer 2 | | | 4.24 | ○ |
| Sample 18-13 | Tacky Diffusion Layer 3 | | | 1.64 | ○ |
| Sample 19-1 | Diffusion Film 1 | 200 | 2.3 | 6.48 | ○ |
| Sample 19-2 | Diffusion Film 2 | | | 3.21 | ○ |
| Sample 19-3 | Diffusion Film 3 | | | 3.20 | ○ |
| Sample 19-4 | Diffusion Film 4 | | | 3.17 | ○ |
| Sample 19-5 | Diffusion Film 5 | | | 3.08 | ○ |
| Sample 19-6 | Diffusion Film 6 | | | 2.89 | ○ |
| Sample 19-7 | Diffusion Film 7 | | | 2.32 | ○ |
| Sample 19-8 | Diffusion Film 8 | | | 2.12 | ○ |
| Sample 19-9 | Diffusion Film 9 | | | 1.54 | X |
| Sample 19-10 | Diffusion Film 10 | | | 0.86 | X |
| Sample 19-11 | Tacky Diffusion Layer 1 | | | 3.24 | ○ |
| Sample 19-12 | Tacky Diffusion Layer 2 | | | 2.33 | ○ |
| Sample 19-13 | Tacky Diffusion Layer 3 | | | 0.90 | X |
| Sample 20-1 | Diffusion Film 1 | 350 | 1.31 | 3.60 | ○ |
| Sample 20-2 | Diffusion Film 2 | | | 1.79 | ○ |
| Sample 20-3 | Diffusion Film 3 | | | 1.78 | ○ |
| Sample 20-4 | Diffusion Film 4 | | | 1.76 | ○ |
| Sample 20-5 | Diffusion Film 5 | | | 1.71 | ○ |
| Sample 20-6 | Diffusion Film 6 | | | 1.61 | ○ |
| Sample 20-7 | Diffusion Film 7 | | | 1.29 | X |
| Sample 20-8 | Diffusion Film 8 | | | 1.18 | X |
| Sample 20-9 | Diffusion Film 9 | | | 0.85 | X |
| Sample 20-10 | Diffusion Film 10 | | | 0.48 | X |
| Sample 20-11 | Tacky Diffusion Layer 1 | | | 1.80 | ○ |
| Sample 20-12 | Tacky Diffusion Layer 2 | | | 1.30 | X |
| Sample 20-13 | Tacky Diffusion Layer 3 | | | 0.50 | X |

Pp: Pixel Pitch
P: Lens Width
H: Haze
T: Total Light Transmissivity Amount

TABLE 12

| Film/Diffusion Layer Type | P (μ/m) | Pp/P (—) | Relative Front Luminance Value (%) | View Angle (degree) VAh | View Angle (degree) VAv |
|---|---|---|---|---|---|
| Sample 17-14 | No | 50 | 9.2 | 94 | 103 | 70 |
| Sample 17-1 | Diffusion Film 1 | | | 44 | 126 | 127 |
| Sample 17-2 | Diffusion Film 2 | | | 93 | 85 | 72 |
| Sample 17-3 | Diffusion Film 3 | | | 94 | 82 | 70 |
| Sample 17-4 | Diffusion Film 4 | | | 94 | 82 | 70 |
| Sample 17-5 | Diffusion Film 5 | | | 93 | 84 | 70 |
| Sample 17-6 | Diffusion Film 6 | | | 97 | 86 | 71 |
| Sample 17-7 | Diffusion Film 7 | | | 95 | 98 | 74 |
| Sample 17-8 | Diffusion Film 8 | | | 94 | 100 | 71 |
| Sample 17-9 | Diffusion Film 9 | | | 93 | 102 | 70 |
| Sample 17-10 | Diffusion Film 10 | | | 94 | 103 | 71 |
| Sample 17-11 | Tacky Diffusion Layer 1 | | | 95 | 74 | 63 |
| Sample 17-12 | Tacky Diffusion Layer 2 | | | 94 | 86 | 62 |
| Sample 17-13 | Tacky Diffusion Layer 3 | | | 95 | 92 | 61 |
| Sample 18-14 | No | 110 | 4.18 | 97 | 100 | 70 |
| Sample 18-1 | Diffusion Film 1 | | | 47 | 126 | 127 |
| Sample 18-2 | Diffusion Film 2 | | | 97 | 82 | 71 |

TABLE 12-continued

| Film/Diffusion Layer Type | | P (μ/m) | Pp/P (—) | Relative Front Luminance Value (%) | View Angle (degree) VAh | View Angle (degree) VAv |
|---|---|---|---|---|---|---|
| Sample 18-3 | Diffusion Film 3 | | | 96 | 81 | 70 |
| Sample 18-4 | Diffusion Film 4 | | | 97 | 81 | 72 |
| Sample 18-5 | Diffusion Film 5 | | | 95 | 84 | 71 |
| Sample 18-6 | Diffusion Film 6 | | | 99 | 85 | 71 |
| Sample 18-7 | Diffusion Film 7 | | | 97 | 94 | 72 |
| Sample 18-8 | Diffusion Film 8 | | | 96 | 96 | 71 |
| Sample 18-9 | Diffusion Film 9 | | | 95 | 100 | 70 |
| Sample 18-10 | Diffusion Film 10 | | | 97 | 100 | 71 |
| Sample 18-11 | Tacky Diffusion Layer 1 | | | 98 | 75 | 65 |
| Sample 18-12 | Tacky Diffusion Layer 2 | | | 97 | 85 | 63 |
| Sample 18-13 | Tacky Diffusion Layer 3 | | | 97 | 91 | 60 |
| Sample 19-14 | No | 200 | 2.3 | 99 | 97 | 64 |
| Sample 19-1 | Diffusion Film 1 | | | 48 | 127 | 126 |
| Sample 19-2 | Diffusion Film 2 | | | 98 | 76 | 66 |
| Sample 19-3 | Diffusion Film 3 | | | 98 | 77 | 64 |
| Sample 19-4 | Diffusion Film 4 | | | 98 | 76 | 65 |
| Sample 19-5 | Diffusion Film 5 | | | 98 | 79 | 65 |
| Sample 19-6 | Diffusion Film 6 | | | 100 | 81 | 67 |
| Sample 19-7 | Diffusion Film 7 | | | 98 | 87 | 65 |
| Sample 19-8 | Diffusion Film 8 | | | 97 | 88 | 63 |
| Sample 19-9 | Diffusion Film 9 | | | 96 | 94 | 64 |
| Sample 19-10 | Diffusion Film 10 | | | 99 | 95 | 64 |
| Sample 19-11 | Tacky Diffusion Layer 1 | | | 98 | 75 | 66 |
| Sample 19-12 | Tacky Diffusion Layer 2 | | | 98 | 86 | 62 |
| Sample 19-13 | Tacky Diffusion Layer 3 | | | 99 | 90 | 60 |
| Sample 20-14 | No | 350 | 1.31 | 99 | 95 | 62 |
| Sample 20-1 | Diffusion Film 1 | | | 49 | 126 | 126 |
| Sample 20-2 | Diffusion Film 2 | | | 99 | 75 | 65 |
| Sample 20-3 | Diffusion Film 3 | | | 99 | 74 | 63 |
| Sample 20-4 | Diffusion Film 4 | | | 99 | 75 | 65 |
| Sample 20-5 | Diffusion Film 5 | | | 99 | 76 | 64 |
| Sample 20-6 | Diffusion Film 6 | | | 102 | 80 | 66 |
| Sample 20-7 | Diffusion Film7 | | | 99 | 85 | 65 |
| Sample 20-8 | Diffusion Film 8 | | | 98 | 87 | 61 |
| Sample 20-9 | Diffusion Film 9 | | | 99 | 90 | 62 |
| Sample 20-10 | Diffusion Film 10 | | | 99 | 92 | 62 |
| Sample 20-11 | Tacky Diffusion Layer 1 | | | 99 | 74 | 64 |
| Sample 20-12 | Tacky Diffusion Layer 2 | | | 99 | 84 | 62 |
| Sample 20-13 | Tacky Diffusion Layer 3 | | | 99 | 92 | 62 |

Pp: Pixel Pitch
P: Lens Width
VAh: View Angle in Horizontal Direction
VAv: View Angle in Vertical Direction

TABLE 13

| Film/Diffusion Layer Type | | P (μm) | Pp/P (—) | (H/T) * (Pp/P) | Moire Evaluation |
|---|---|---|---|---|---|
| Sample 21-1 | Diffusion Film 1 | 50 | 10.2 | 28.73 | ◯ |
| Sample 21-2 | Diffusion Film 2 | | | 14.24 | ◯ |
| Sample 21-3 | Diffusion Film 3 | | | 14.20 | ◯ |
| Sample 21-4 | Diffusion Film 4 | | | 14.04 | ◯ |
| Sample 21-5 | Diffusion Film 5 | | | 13.66 | ◯ |
| Sample 21-6 | Diffusion Film 6 | | | 12.81 | ◯ |
| Sample 21-7 | Diffusion Film 7 | | | 10.28 | ◯ |
| Sample 21-8 | Diffusion Film 8 | | | 9.41 | ◯ |
| Sample 21-9 | Diffusion Film 9 | | | 6.81 | ◯ |
| Sample 21-10 | Diffusion Film 10 | | | 3.82 | ◯ |
| Sample 21-11 | Tacky Diffusion Layer 1 | | | 14.37 | ◯ |
| Sample 21-12 | Tacky Diffusion Layer 2 | | | 10.35 | ◯ |
| Sample 21-13 | Tacky Diffusion Layer 3 | | | 4.01 | ◯ |
| Sample 22-1 | Diffusion Film 1 | 110 | 4.64 | 13.04 | ◯ |
| Sample 22-2 | Diffusion Film 2 | | | 6.47 | ◯ |
| Sample 22-3 | Diffusion Film 3 | | | 6.45 | ◯ |
| Sample 22-4 | Diffusion Film 4 | | | 6.37 | ◯ |
| Sample 22-5 | Diffusion Film 5 | | | 6.20 | ◯ |
| Sample 22-6 | Diffusion Film 6 | | | 5.81 | ◯ |
| Sample 22-7 | Diffusion Film 7 | | | 4.67 | ◯ |
| Sample 22-8 | Diffusion Film 8 | | | 4.27 | ◯ |
| Sample 22-9 | Diffusion Film 9 | | | 3.09 | ◯ |
| Sample 22-10 | Diffusion Film 10 | | | 1.73 | ◯ |
| Sample 22-11 | Tacky Diffusion Layer 1 | | | 6.52 | ◯ |
| Sample 22-12 | Tacky Diffusion Layer 2 | | | 4.70 | ◯ |
| Sample 22-13 | Tacky Diffusion Layer 3 | | | 1.82 | ◯ |
| Sample 23-1 | Diffusion Film 1 | 200 | 2.55 | 6.48 | ◯ |
| Sample 23-2 | Diffusion Film 2 | | | 3.21 | ◯ |
| Sample 23-3 | Diffusion Film 3 | | | 3.20 | ◯ |

TABLE 13-continued

| Film/Diffusion Layer Type | P (μm) | Pp/P (—) | (H/T) * (Pp/P) | Moire Evaluation |
|---|---|---|---|---|
| Sample 23-4 | Diffusion Film 4 | | | 3.17 | ○ |
| Sample 23-5 | Diffusion Film 5 | | | 3.08 | ○ |
| Sample 23-6 | Diffusion Film 6 | | | 2.89 | ○ |
| Sample 23-7 | Diffusion Film 7 | | | 2.32 | ○ |
| Sample 23-8 | Diffusion Film 8 | | | 2.12 | ○ |
| Sample 23-9 | Diffusion Film 9 | | | 1.54 | X |
| Sample 23-10 | Diffusion Film 10 | | | 0.86 | X |
| Sample 23-11 | Tacky Diffusion Layer 1 | | | 3.24 | ○ |
| Sample 23-12 | Tacky Diffusion Layer 2 | | | 2.33 | ○ |
| Sample 23-13 | Tacky Diffusion Layer 3 | | | 0.90 | X |
| Sample 24-1 | Diffusion Film 1 | 350 | 1.46 | 4.00 | ○ |
| Sample 24-2 | Diffusion Film 2 | | | 1.98 | ○ |
| Sample 24-3 | Diffusion Film 3 | | | 1.98 | ○ |
| Sample 24-4 | Diffusion Film 4 | | | 1.95 | ○ |
| Sample 24-5 | Diffusion Film 5 | | | 1.90 | ○ |
| Sample 24-6 | Diffusion Film 6 | | | 1.78 | ○ |
| Sample 24-7 | Diffusion Film 7 | | | 1.43 | X |
| Sample 24-8 | Diffusion Film 8 | | | 1.31 | X |
| Sample 24-9 | Diffusion Film 9 | | | 0.95 | X |
| Sample 24-10 | Diffusion Film 10 | | | 0.53 | X |
| Sample 24-11 | Tacky Diffusion Layer 1 | | | 2.00 | ○ |
| Sample 24-12 | Tacky Diffusion Layer 2 | | | 1.44 | X |
| Sample 24-13 | Tacky Diffusion Layer 3 | | | 0.56 | X |

Pp: Pixel Pitch
P: Lens Width
H: Haze
T: Total Light Transmissivity Amount

TABLE 14

| Film/Diffusion Layer Type | P (μm) | Pp/P (—) | Relative Front Luminance Value (%) | View Angle (degree) VAh | View Angle (degree) VAv |
|---|---|---|---|---|---|
| Sample 21-14 | No | 50 | 10.2 | 94 | 102 | 70 |
| Sample 21-1 | Diffusion Film 1 | | | 45 | 126 | 127 |
| Sample 21-2 | Diffusion Film 2 | | | 93 | 84 | 71 |
| Sample 21-3 | Diffusion Film 3 | | | 93 | 83 | 69 |
| Sample 21-4 | Diffusion Film 4 | | | 94 | 83 | 70 |
| Sample 21-5 | Diffusion Film 5 | | | 93 | 83 | 69 |
| Sample 21-6 | Diffusion Film 6 | | | 97 | 85 | 70 |
| Sample 21-7 | Diffusion Film 7 | | | 93 | 97 | 73 |
| Sample 21-8 | Diffusion Film 8 | | | 95 | 99 | 71 |
| Sample 21-9 | Diffusion Film 9 | | | 94 | 101 | 70 |
| Sample 21-10 | Diffusion Film 10 | | | 93 | 103 | 72 |
| Sample 21-11 | Tacky Diffusion Layer 1 | | | 95 | 74 | 63 |
| Sample 21-12 | Tacky Diffusion Layer 2 | | | 95 | 86 | 62 |
| Sample 21-13 | Tacky Diffusion Layer 3 | | | 93 | 92 | 61 |
| Sample 22-14 | No | 110 | 4.63 | 96 | 99 | 69 |
| Sample 22-1 | Diffusion Film 1 | | | 47 | 125 | 126 |
| Sample 22-2 | Diffusion Film 2 | | | 96 | 81 | 72 |
| Sample 22-3 | Diffusion Film 3 | | | 95 | 80 | 69 |
| Sample 22-4 | Diffusion Film 4 | | | 96 | 80 | 71 |
| Sample 22-5 | Diffusion Film 5 | | | 95 | 83 | 70 |
| Sample 22-6 | Diffusion Film 6 | | | 99 | 84 | 70 |
| Sample 22-7 | Diffusion Film 7 | | | 96 | 93 | 71 |
| Sample 22-8 | Diffusion Film 8 | | | 97 | 95 | 70 |
| Sample 22-9 | Diffusion Film 9 | | | 96 | 99 | 69 |
| Sample 22-10 | Diffusion Film 10 | | | 96 | 99 | 70 |
| Sample 22-11 | Tacky Diffusion Layer 1 | | | 98 | 75 | 65 |
| Sample 22-12 | Tacky Diffusion Layer 2 | | | 97 | 85 | 63 |
| Sample 22-13 | Tacky Diffusion Layer 3 | | | 96 | 91 | 60 |
| Sample 23-14 | No | 200 | 2.55 | 98 | 96 | 64 |
| Sample 23-1 | Diffusion Film 1 | | | 48 | 127 | 125 |
| Sample 23-2 | Diffusion Film 2 | | | 98 | 75 | 65 |
| Sample 23-3 | Diffusion Film 3 | | | 97 | 76 | 63 |
| Sample 23-4 | Diffusion Film 4 | | | 97 | 75 | 64 |
| Sample 23-5 | Diffusion Film 5 | | | 97 | 78 | 64 |
| Sample 23-6 | Diffusion Film 6 | | | 100 | 80 | 66 |
| Sample 23-7 | Diffusion Film 7 | | | 98 | 86 | 64 |
| Sample 23-8 | Diffusion Film 8 | | | 98 | 87 | 62 |
| Sample 23-9 | Diffusion Film 9 | | | 97 | 92 | 63 |
| Sample 23-10 | Diffusion Film 10 | | | 98 | 97 | 63 |
| Sample 23-11 | Tacky Diffusion Layer 1 | | | 99 | 75 | 66 |
| Sample 23-12 | Tacky Diffusion Layer 2 | | | 98 | 86 | 62 |
| Sample 23-13 | Tacky Diffusion Layer 3 | | | 97 | 90 | 60 |
| Sample 24-14 | No | 350 | 1.46 | 99 | 94 | 60 |
| Sample 24-1 | Diffusion Film 1 | | | 49 | 124 | 124 |
| Sample 24-2 | Diffusion Film 2 | | | 99 | 74 | 63 |

TABLE 14-continued

| | Film/Diffusion Layer Type | P (μm) | Pp/P (—) | Relative Front Luminance Value (%) | View Angle (degree) VAh | View Angle (degree) VAv |
|---|---|---|---|---|---|---|
| Sample 24-3 | Diffusion Film 3 | | | 98 | 72 | 62 |
| Sample 24-4 | Diffusion Film 4 | | | 99 | 73 | 64 |
| Sample 24-5 | Diffusion Film 5 | | | 99 | 75 | 63 |
| Sample 24-6 | Diffusion Film 6 | | | 102 | 79 | 62 |
| Sample 24-7 | Diffusion Film 7 | | | 99 | 83 | 62 |
| Sample 24-8 | Diffusion Film 8 | | | 99 | 84 | 60 |
| Sample 24-9 | Diffusion Film 9 | | | 98 | 88 | 60 |
| Sample 24-10 | Diffusion Film 10 | | | 99 | 92 | 64 |
| Sample 24-11 | Tacky Diffusion Layer 1 | | | 99 | 74 | 64 |
| Sample 24-12 | Tacky Diffusion Layer 2 | | | 99 | 84 | 62 |
| Sample 24-13 | Tacky Diffusion Layer 3 | | | 98 | 92 | 62 |

Pp: Pixel Pitch
P: Lens Width
VAh: View Angle in Horizontal Direction
VAv: View Angle in Vertical Direction

TABLE 15

| | Film/Diffusion Layer Type | P (μm) | Pp/P (—) | (H/T) * (Pp/P) | Moire Evaluation |
|---|---|---|---|---|---|
| Sample 25-1 | Diffusion Film 2 | 50 | 6.4 | 18.02 | ○ |

Pp: Pixel Pitch
P: Lens Width
H: Haze
T: Total Light Transmissivity Amount

TABLE 16

| | Film/Diffusion Layer Type | P (μm) | Pp/P (—) | Relative Front Luminance Value (%) | View Angle (degree) VAh | View Angle (degree) VAv |
|---|---|---|---|---|---|---|
| Sample 25-1 | Diffusion Film 2 | 50 | 6.4 | 100 | 95 | 64 |

Pp: Pixel Pitch
P: Lens Width
VAh: View Angle in Horizontal Direction
VAv: View Angle in Vertical Direction

TABLE 17

| | Film/Diffusion Layer Type | Pp (μm) | P (μm) | Pp/P (—) | (H/T) (—) | (H/T) * (Pp/P) | Moire Evaluation |
|---|---|---|---|---|---|---|---|
| Sample 26-1 | DBEFD | 320 | 50 | 6.40 | 1.74 | 11.14 | ○ |
| Sample 26-2 | DBEFD | 320 | 110 | 2.91 | 1.74 | 5.06 | ○ |
| Sample 26-3 | DBEFD | 320 | 200 | 1.60 | 1.74 | 2.78 | ○ |
| Sample 26-4 | DBEFD | 320 | 350 | 0.91 | 1.74 | 1.59 | X |
| Sample 26-5 | DBEFD | 510 | 50 | 10.20 | 1.74 | 17.75 | ○ |
| Sample 26-6 | DBEFD | 510 | 110 | 4.64 | 1.74 | 8.07 | ○ |
| Sample 26-7 | DBEFD | 510 | 200 | 2.55 | 1.74 | 4.44 | ○ |
| Sample 26-8 | DBEFD | 510 | 350 | 1.46 | 1.74 | 2.54 | ○ |
| Sample 26-9 | DBEFD | 460 | 50 | 9.20 | 1.74 | 16.01 | ○ |
| Sample 26-10 | DBEFD | 460 | 110 | 4.18 | 1.74 | 7.28 | ○ |
| Sample 26-11 | DBEFD | 460 | 200 | 2.30 | 1.74 | 4.00 | ○ |
| Sample 26-12 | DBEFD | 460 | 350 | 1.31 | 1.74 | 2.29 | ○ |
| Sample 26-13 | DBEFD | 320 | 50 | 6.40 | 1.74 | 11.14 | ○ |
| Sample 26-14 | DBEFD | 320 | 110 | 2.91 | 1.74 | 5.06 | ○ |
| Sample 26-15 | DBEFD | 320 | 200 | 1.60 | 1.74 | 2.78 | ○ |
| Sample 26-16 | DBEFD | 320 | 350 | 0.91 | 1.74 | 1.59 | X |
| Sample 26-17 | DBEFD | 510 | 50 | 10.20 | 1.74 | 17.75 | ○ |
| Sample 26-18 | DBEFD | 510 | 110 | 4.64 | 1.74 | 8.07 | ○ |
| Sample 26-19 | DBEFD | 510 | 200 | 2.55 | 1.74 | 4.44 | ○ |
| Sample 26-20 | DBEFD | 510 | 350 | 1.46 | 1.74 | 2.54 | ○ |

TABLE 17-continued

| | Film/Diffusion Layer Type | Pp (μm) | P (μm) | Pp/P (—) | (H/T) (—) | (H/T) * (Pp/P) | Moire Evaluation |
|---|---|---|---|---|---|---|---|
| Sample 26-21 | DBEFD | 460 | 50 | 9.20 | 1.74 | 16.01 | ○ |
| Sample 26-22 | DBEFD | 460 | 110 | 4.18 | 1.74 | 7.28 | ○ |
| Sample 26-23 | DBEFD | 460 | 200 | 2.30 | 1.74 | 4.00 | ○ |
| Sample 26-24 | DBEFD | 460 | 350 | 1.46 | 1.74 | 2.54 | ○ |

Pp: Pixel Pitch
P: Lens Width
H: Haze
T: Total Light Transmissivity Amount

TABLE 18

| | Film/Diffusion Layer Type | Pp (μm) | P (μm) | Pp/P (—) | (H/T) (—) | Relative Front Luminance Value (%) | View Angle (degree) VAh | View Angle (degree) VAv |
|---|---|---|---|---|---|---|---|---|
| Sample 26-1 | DBEFD | 320 | 50 | 6.40 | 1.74 | 11.14 | 96 | 69 |
| Sample 26-2 | DBEFD | 320 | 110 | 2.91 | 1.74 | 5.06 | 96 | 66 |
| Sample 26-3 | DBEFD | 320 | 200 | 1.60 | 1.74 | 2.78 | 96 | 66 |
| Sample 26-4 | DBEFD | 320 | 350 | 0.91 | 1.74 | 1.59 | 95 | 67 |
| Sample 26-5 | DBEFD | 510 | 50 | 10.20 | 1.74 | 17.75 | 95 | 69 |
| Sample 26-6 | DBEFD | 510 | 110 | 4.64 | 1.74 | 8.07 | 95 | 65 |
| Sample 26-7 | DBEFD | 510 | 200 | 2.55 | 1.74 | 4.44 | 96 | 65 |
| Sample 26-8 | DBEFD | 510 | 350 | 1.46 | 1.74 | 2.54 | 96 | 65 |
| Sample 26-9 | DBEFD | 460 | 50 | 9.20 | 1.74 | 16.01 | 95 | 67 |
| Sample 26-10 | DBEFD | 460 | 110 | 4.18 | 1.74 | 7.28 | 95 | 67 |
| Sample 26-11 | DBEFD | 460 | 200 | 2.30 | 1.74 | 4.00 | 95 | 66 |
| Sample 26-12 | DBEFD | 460 | 350 | 1.31 | 1.74 | 2.29 | 95 | 67 |
| Sample 26-13 | DBEFD | 320 | 50 | 6.40 | 1.74 | 11.14 | 106 | 76 |
| Sample 26-14 | DBEFD | 320 | 110 | 2.91 | 1.74 | 5.06 | 104 | 79 |
| Sample 26-15 | DBEFD | 320 | 200 | 1.60 | 1.74 | 2.78 | 100 | 68 |
| Sample 26-16 | DBEFD | 320 | 350 | 0.91 | 1.74 | 1.59 | 98 | 67 |
| Sample 26-17 | DBEFD | 510 | 50 | 10.20 | 1.74 | 17.75 | 105 | 75 |
| Sample 26-18 | DBEFD | 510 | 110 | 4.64 | 1.74 | 8.07 | 103 | 78 |
| Sample 26-19 | DBEFD | 510 | 200 | 2.55 | 1.74 | 4.44 | 100 | 67 |
| Sample 26-20 | DBEFD | 510 | 350 | 1.46 | 1.74 | 2.54 | 97 | 66 |
| Sample 26-21 | DBEFD | 460 | 50 | 9.20 | 1.74 | 16.01 | 104 | 74 |
| Sample 26-22 | DBEFD | 460 | 110 | 4.18 | 1.74 | 7.28 | 102 | 77 |
| Sample 26-23 | DBEFD | 460 | 200 | 2.30 | 1.74 | 4.00 | 100 | 66 |
| Sample 26-24 | DBEFD | 460 | 350 | 1.46 | 1.74 | 2.54 | 96 | 65 |

Figure 14:
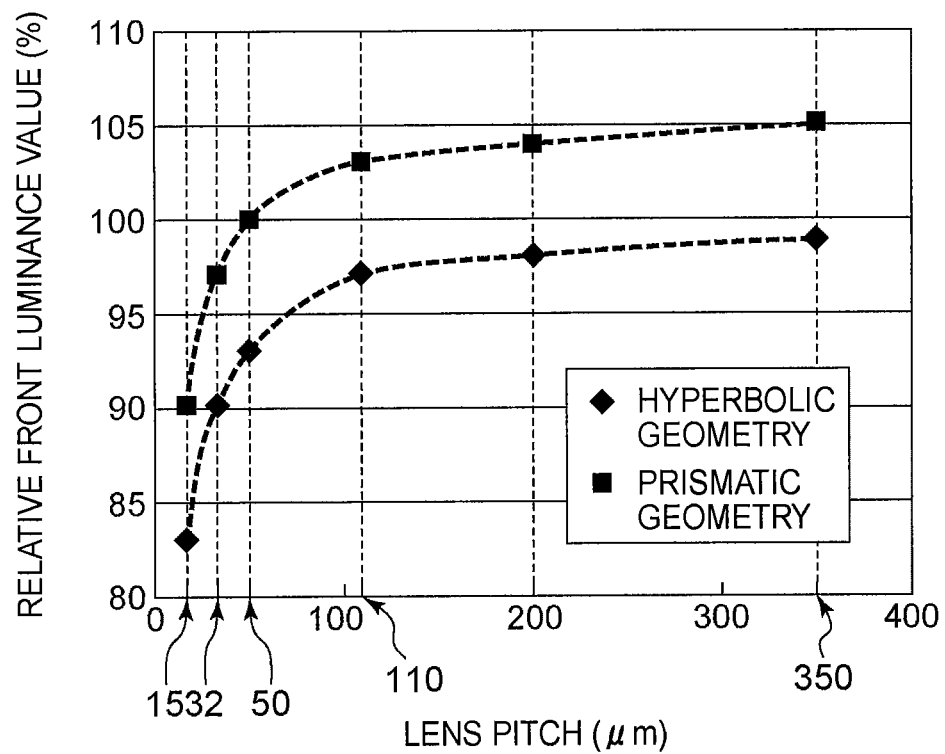
FIG. 14 is a graph showing relations between a lens pitch and a relative front luminance value.

Pp: Pixel Pitch
P: Lens Width
VAh: View Angle in Horizontal Direction
VAv: View Angle in Vertical Direction FIG. 14 shows relations between the lens pitch and the front luminance of the lens sheet having the prismatic sectional geometry and the hyperbolic sectional geometry, as being combined with the diffusion sheet 102 shown in Table 3 (samples 1-3, 1-15, 1-16, 2-3, 3-3, 4-3), Table 9 (samples 13-3, 13-15, 13-16, 14-3, 15-3, 16-3), and Table 15(sample 25-1).

Values given in the graph are expressed, by assuming the front luminance observed for the case where a 50-μm-pitch prismatic lens sheet was used as 100%. It is known from the graph that the relative front luminance decreases as the lens pitch becomes narrower, whereas the relative front luminance value increases as the lens pitch becomes wider.

Similarly, also a front luminance value of 100% was observed when "Thick BEF III" (50-μm pitch) from 3M Company was used, proving an effect of improving the front luminance as compared with existing products.

Narrow lens pitch means increase in the number of ridges and valleys per unit area, but this portion contains flat portions in an enlarged view. The sheet therefore becomes less likely to achieve an effect as the lens, consequently increases scattering into directions other than the front direction, degrades the recycling characteristics ascribable to absolute reflection of light contributed by inclination of the slope, and thereby lowers the front luminance.

On the contrary, widening of the lens pitch decreases the number of ridges and valleys per unit area, and decreases also the flat portions in these areas. For this reason, the sheet becomes less likely to impair the effect as the lens, reduces the scattering into directions other than the front direction, allows the recycling characteristics contributed by inclination of the slope to exhibit in a more effective manner so as to prevent the front luminance from lowering, and further enhances the front luminance. It was therefore found that the front luminance can be improved by widening the lens pitch.

However, as is clear from the results shown in Table 3 to Table 14 for the case where the diffusion sheet was not used in combination, moire fringes (non-uniformity in contrast) inevitably generates due to interaction (interference) with the pixel pitch of the liquid crystal panel, only simply by widening the lens pitch. Use of the narrow-pitch-type sheet has been a general practice of clearing the moire fringes in the related arts, only resulted in lowered luminance as described in the above.

In contrast, the present application adopts a system expressed by the value of Pp/P·He/Tt adjusted to 1.6 or above, using panel pitch Pp, lens pitch P, haze value He of the diffusion functional layer measured by back scattering, and total beam transmissivity Tt obtained at the same time in the measurement of back scattering, and thereby successfully clears the moire fringes which has been generated simply by the lenses having a wide pitch, and improves the front luminance.

Haze value found in conjunction with JIS or ASTM is generally expressed based on measurement of front scattering directing the diffusion functional surface to the incident side, wherein the haze values listed in Table 2 were those obtained in this way, whereas it is difficult to find out relations capable of clearing moire fringes. However, by using measured haze values of the diffusion functional surface based on back scattering, it is made possible to satisfy the above-described relations.

It is also found that larger ratio of enhancement in the luminance is obtained in a case where the measured haze values based on back scattering are larger than the measured haze values based on front scattering (results of samples using diffusion sheet 6 shown in Table 1, samples 2-6 to 24-6). It is therefore made possible to further improve the front luminance, by using the diffusion functional layer showing larger haze values in back scattering measurement.

The above-described embodiments dealt with the case where the diffusion film was provided between the first film and the liquid crystal panel. However, a position of providing the diffusion film is not limited to that in the above-described embodiments so far as it is between the first film and a black matrix of the liquid crystal panel. For example, it is also allowable to configure a tacky layer, used for bonding the polarizer plate to the liquid crystal panel, as having a diffusion function similar to that owned by the diffusion film.

As has been described in the above, the present application can prevent deflection of the sheet ascribable to expansion of the sheet size, by ensuring an appropriate level of rigidity. By contribution of this configuration, it is made possible to improve handlability of the sheet and to thereby improve the workability in the assembly process of the backlight device or the liquid crystal display device, and further to suppress deflection-induced disturbance in the beam condensing characteristics, and thereby to suppress degradation of image quality.

Also as has been described in the above, the present application can suppress moire fringes, while achieving a desired level of surface luminance, because the lens pitch P (μm) of the first film, haze value H (%) and total beam transmissivity T (%) of the second film, obtained by measurement of back scattering, and pixel pitch Pp (μm) of the liquid crystal panel satisfy the relations of H/T·Pp/P>1.6, and P>110 μm.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. An optical sheet comprising:
a light-transmissive base; and
an optical functional layer provided on a light-emitting surface of the transmissive base,
wherein the base is composed of a stack of transmissive sheets bonded while placing an adhesive material layer in between,
wherein the optical functional layer is a beam-condensing layer having a plurality of irregularity portions consecutively arranged on a surface thereof, and
wherein the optical sheet is a beam-condensing sheet which improves directionality of an irradiated light.

2. The optical sheet as claimed in claim 1, wherein the optical sheet is a prism sheet and each of the irregularity portions is a prism having a triangular cross-sectional geometry.

3. The optical sheet as claimed in claim 1, wherein the adhesive material layer is composed of any one of ultraviolet-curing adhesive, pressure-sensitive adhesive and hot-melt adhesive.

4. The optical sheet as claimed in claim 1, wherein the irregularity portions show different refractive indices in a direction of ridges and in a direction of arrangement.

5. The optical sheet as claimed in claim 1, wherein the stack comprises:
a first sheet base supporting the optical functional layer; and
a second sheet base opposed to the first sheet base while placing the adhesive material layer in between.

6. The optical sheet as claimed in claim 5, wherein at least either one of the first sheet base and the second sheet base comprises an ultraviolet absorber.

7. The optical sheet as claimed in claim 5, wherein a refractive index of the adhesive material layer is equivalent to, or smaller than refractive indices of the first and second sheet bases.

8. The optical sheet as claimed in claim 5, wherein the adhesive material layer comprises a blue dye.

9. The optical sheet as claimed in claim 1, wherein a pitch of arrangement of the irregularity portions is 110 μm or larger.

10. The optical sheet as claimed in claim 1, wherein a pitch of arrangement of said irregularity portions is 110 μm or more and 350 μm or less.

11. A liquid crystal display device having a liquid crystal display panel, a light source disposed on a back surface side of the liquid crystal display panel, and an optical sheet disposed between the liquid crystal display panel and the light source, wherein:
the optical sheet includes:
a light-transmissive base; and
an optical functional layer provided on a light-emitting surface of the base, wherein:
the base is composed of a stack of transmissive sheets bonded while placing an adhesive material layer in between,
the optical functional layer is a beam-condensing layer having a plurality of irregularity portions consecutively arranged on a surface thereof, and
the optical sheet is a beam-condensing sheet which improves directionality of an irradiated light.

12. The optical sheet as claimed in claim 5, wherein a surface of the second sheet base opposite to a surface facing the first sheet base is roughened.

13. The optical sheet as claimed in claim 12, wherein the roughened surface comprises projections having a height of 0.20 μm or greater above the average center level.

14. The optical sheet as claimed in claim 13, wherein the density of projections is between 70/mm$^2$ and 400/mm$^2$.

15. The optical sheet as claimed in claim 5, wherein the first and second sheet bases are composed of the same material.

16. The optical sheet as claimed in claim 1, wherein an angle formed between directions of molecular alignment of the transmissive sheets is 20° or less.

* * * * *